(12) United States Patent
Ishii

(10) Patent No.: US 7,884,892 B2
(45) Date of Patent: Feb. 8, 2011

(54) ELECTRO-OPTICAL DEVICE, METHOD OF TESTING THE SAME, AND ELECTRONIC APPARATUS

(75) Inventor: Kenya Ishii, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 1212 days.

(21) Appl. No.: 11/464,652

(22) Filed: Aug. 15, 2006

(65) Prior Publication Data
US 2007/0040983 A1    Feb. 22, 2007

(30) Foreign Application Priority Data

Aug. 18, 2005  (JP) ............................. 2005-237188
May 19, 2006  (JP) ............................. 2006-140015

(51) Int. Cl.
*G02F 1/1333*    (2006.01)
(52) U.S. Cl. .......................... 349/54; 349/149; 349/152
(58) Field of Classification Search .................. 324/770
See application file for complete search history.

(56) References Cited

U.S. PATENT DOCUMENTS 6,300,998 B1 * 10/2001  Aruga ........................ 349/192
6,940,301 B2 * 9/2005  Chen .......................... 324/770
6,982,568 B2    1/2006  Nojiri et al.

FOREIGN PATENT DOCUMENTS

| JP | A 2004-004993 | 1/2004 |
| JP | A 2004-205852 | 7/2004 |
| JP | A 2004-226931 | 8/2004 |
| JP | A 2005-62354  | 3/2005 |
| KR | 2004-0079820  | 9/2004 |

* cited by examiner

*Primary Examiner*—Richard H Kim
(74) *Attorney, Agent, or Firm*—Oliff & Berridge, PLC

(57) ABSTRACT

An electro-optical device includes: a counter substrate; an element substrate comprising a protruding region protruding from one side of the counter substrate and being bonded to the counter substrate; a plurality of pixel units that are arranged in a pixel region on the element substrate; a plurality of external circuit connecting terminals which are arranged in the protruding region on the element substrate and to which various signals including image signals and control signals for allowing the plurality of pixel units to display an image are supplied; and a plurality of test terminals that are provided at both ends of an array of the plurality of external circuit connecting terminals in the protruding region and are supplied with test signals, wherein a distance between adjacent test terminals is longer than a distance between adjacent external circuit connecting terminals.

12 Claims, 10 Drawing Sheets

ELECTRO-OPTICAL DEVICE, METHOD OF TESTING THE SAME, AND ELECTRONIC APPARATUS

BACKGROUND

1. Technical Field

The present invention relates to an electro-optical device, such as a liquid crystal display device, a method of testing the electro-optical device, and an electronic apparatus including the electro-optical device.

2. Related Art

In general, electro-optical devices include an element substrate, a counter substrate, and an electro-optical material interposed therebetween. A plurality of pixels are arranged in a matrix in a pixel region (or an image display region) in plan view, and a display element including an electro-optical material is formed in each of the pixels. The counter substrate is smaller than the element substrate, that is, the element substrate protrudes from one side of the counter substrate in plan view. In a peripheral region of the pixel region, a plurality of external circuit connecting terminals are arranged along one side of the element substrate protruding from or exposed from the counter substrate. Various signals for selecting and turning on the plurality of display elements when the electro-optical device is driven, such as image signals, control signals, and power voltage signals, are supplied to the plurality of external circuit connecting terminals. For example, the electro-optical devices are manufactured by arranging a large board having the counter substrates formed thereon on a large board having a plurality of elements substrates formed thereon such that the counter substrates are opposite to the element substrates, by bonding the counter substrates to the element substrates by a sealing material, and by dividing the two large boards into a plurality of pairs of element substrates and counter substrates.

In general, test terminals to/from which test signals are input/output are provided in the peripheral region of the element substrate. The test terminals are used to test the breaking and short-circuit of circuits or wiring lines, the operation of circuits, and the operational state of the display elements when the electro-optical device is being manufactured, when it is mounted after manufacture, or before shipment.

JP-A-2004-205852 and JP-A-2004-226931 disclose an electro-optical device having the following structure: a plurality of external circuit connecting terminals are arranged along one side of the element substrate in the peripheral region and a plurality of test terminals are arranged at both ends of an array of the external circuit connecting terminals, in order to easily perform a lighting luminous test by using inexpensive test equipment. According to this structure, in the electro-optical device, the display elements performs luminous display on the basis of only the driving signals supplied from an external circuit mounted on the plurality of external circuit connecting terminals at the time of driving, and the display elements performs luminous display on the basis of only the test signals supplied to the test terminals through probes, at the time of testing. More specifically, at the time of driving, a plurality of driving signals including three types of image signals for R (red), G (green), and B (blue) are supplied, and, a plurality of test signals including three types of test image signals corresponding to these image signals are supplied at the time of testing.

Further, JP-A-2004-4993 discloses an electro-optical device having the following structure: in order to narrow a peripheral region, a plurality of test terminals are arranged at corners of a pixel region in a peripheral region of an element substrate below a sealing material for bonding an element substrate to a counter substrate so as to overlap a portion of the sealing material in plan view. The test terminals are used for a test before the element substrate and the counter substrate are bonded to each other in the manufacturing process of the electro-optical device.

However, according to the structures disclosed in JP-A-2004-20585 and JP-A-2004-226931, for example, when the image signals are supplied at the time of driving as signals whose phases are expanded into 6 phases, 12 phases, and so on by serial-to-parallel conversion, instead of three types of signals for R, G, and B, the test image signals of the type corresponding to the image signals are supplied at the time of testing. Therefore, the number of test terminals supplied with the test image signals increases, which makes it necessary to ensure a wide region for arranging the test terminals on the element substrate. That is, when the size of the element substrate is reduced, it is practically difficult to bring the probe into contact with the test terminals to perform their test.

Furthermore, according to the structure disclosed in JP-A-2004-4993, it is necessary to ensure a sufficient sealing-material-forming region to arrange a plurality of test terminals in the peripheral region of the element substrate. In addition, it is necessary to ensure a region required to arrange a driving circuit for driving a plurality of display elements on the basis of driving signals outside the region where the sealing material is formed. Also, in the manufacturing process of the electro-optical device, a region for cutting adjacent element substrates needs to be ensured around the outer periphery of each element substrate on a large board.

SUMMARY

An advantage of some aspects of the invention is that it provides an electro-optical device capable of easily performing a test after an element substrate and a counter substrate are bonded to each other and having a small size, a method of testing the electro-optical device, and an electronic apparatus including the electro-optical device.

According to a first aspect of the invention, an electro-optical device includes: a counter substrate; an element substrate comprising a protruding region protruding from one side of the counter substrate and being bonded to the counter substrate; a plurality of pixel units that are arranged in a pixel region on the element substrate; a plurality of external circuit connecting terminals which are arranged in the protruding region on the element substrate and to which various signals including image signals and control signals for allowing the plurality of pixel units to display an image are supplied; and a plurality of test terminals that are provided at both ends of an array of the plurality of external circuit connecting terminals in the protruding region and are supplied with test signals, wherein a distance between adjacent test terminals is longer than a distance between adjacent external circuit connecting terminals.

In the electro-optical device according to this aspect, the element substrate and the counter substrate are arranged opposite to each other, and the element substrate and the counter substrate are bonded to each other by a sealing material formed in a sealing region positioned around the peripheral region of the pixel region between the element substrate and the counter substrate, for example, around the outer periphery of the pixel region. For example, liquid crystal, serving as an electro-optical material, is interposed between the element substrate and the counter substrate. More specifically, the liquid crystal is injected into a 'pixel region' that is surrounded by the sealing region and has a plurality of pixels arranged in an array shape in plan view therein, between the element substrate and the counter substrate. Pixel units each having a display element, such as a liquid crystal element, are arranged in the pixel region of the element substrate, for example, in a matrix at predetermined intervals in the horizontal and vertical direction. Each pixel unit is formed by interposing the electro-optical material between the pixel electrode formed in each pixel of the element substrate and the counter electrode formed on the counter substrate so as to be opposite to the pixel electrode. The element substrate has a larger size than the counter substrate, so that the element substrate protrudes from or is exposed from one side of the counter substrate in plan view. The plurality of external circuit connecting terminals are arranged along one side of the protruding region. In general, an external circuit mounted on a wiring substrate including, for example, a flexible substrate as COF (Chip On Flexible printed circuit) electrically connected to the plurality of external circuit connecting terminals through a flexible printed circuit (FPC), a flexible substrate, or a flexible connector after a test after bonding, a display test, which will be described later.

According to the electro-optical device having the above-mentioned structure, various signals including, for example, image signals, control signals, and power voltage signals are supplied from an external circuit to the plurality of external circuit connecting terminals at the time of normal driving. On the basis of the various signals, for example, the plurality of pixel units are selected for every row, and the pixel units arranged in each row are selected for every column, so the pixel units are driven. In the pixel units driven in this way, a voltage based on a potential between the pixel electrodes and the counter electrode is applied to the electro-optical material, thereby displaying an image.

The electro-optical device is manufactured by bonding the counter substrates formed by dividing a large board to another large board having a plurality of element substrates formed thereon such that the counter substrates are opposite to the element substrates and by dividing another large board into a plurality of pairs of element substrates and counter substrates. Before the external circuit is connected to the plurality of external circuit connecting terminals, a 'test after bonding', which is a typical display test for testing the operation of the pixel units related to image display, is performed on the electro-optical device manufactured by the above-mentioned manufacturing process. In the test after bonding, in the electro-optical device, the plurality of pixel units are driven substantially in the same method as that in which the pixel unit are normally operated to perform solid display on the entire screen, that is, to display a specific color, for example, black, white, or gray substantially on the entire screen, or to perform strip display to display a black stripe line in a background having an intermediate gray-scale level, in the pixel region on the element substrate. Alternatively, the test after bonding may be performed by driving each display unit to check a point defect or a line defect rather than by displaying a specific display image.

In the electro-optical device, in particular, a plurality of test terminals used for the test after bonding are arranged at both ends of the array of the external circuit connecting terminals in the protruding region of the element substrate. More specifically, the test terminals are arranged at one end or both ends of the array of the external circuit connecting terminals on the element substrate in plan view. A distance between plurality of test terminals is longer than a distance between the external circuit connecting terminals.

That is, the distance between the plurality of external circuit connecting terminals is relatively narrow, and pitches therebetween is relatively small. When the test after bonding, which is a display test performed after the element substrate and the counter substrate are bonded to each other, is performed before the external circuit is connected to the external circuit connecting terminals, the test image signals can be collectively supplied to some of the plurality of external circuit connecting terminals to which the image signals are supplied to at the time of normal driving. For example, the collective supply of the test image signals is simply performed through a conductive rubber mounted on the plurality of external circuit connecting terminals. Therefore, even when the pitch between the external circuit connecting terminals is reduced to such an extent that the probe is difficult to or unable to come into contact with each of the external circuit connecting terminals, the test after bonding can be performed without any difficulty.

The distance between the plurality of test terminals is relatively wide, and the pitch therebetween is relatively large. However, the number of test terminals is smaller than the number of external circuit connecting terminals which will be increase according to the number of serial-to-parallel expansions. Therefore, although the external circuit connecting terminals are arranged at a sufficiently large pitch for the probe to come into electrical contact with the external circuit connecting terminal at the time when the test after bonding is performed, a large plane space is not needed. Thus, according to this structure, the plane space is considerably reduced, as compared with the plane space required to bring the probe come into contact with at least the test terminals and the external circuit connecting terminals. In addition, it is preferable that each test terminal be formed to have a larger size than that of the external circuit connecting terminal so that it can be accurately electrically connected to the probe.

In the actual test after bonding, for example, a conductive rubber having anisotropy is electrically connected to the plurality of external circuit connecting terminals having a small pitch, and thus the test image signals can be collectively supplied to the external circuit connecting terminals. In addition, the test signals can be supplied to the plurality of test terminals having a large pitch through, for example, probes. At that time, specifically, the test image signals are supplied, through the conductive rubber, to some of the plurality of external circuit connecting terminals to which the image signals are supplied from the external circuit when the electro-optical device is driven. In this state, it is tested whether image display is performed in the pixel units in response to the test image signals.

The invention also includes a configuration in which the test after bonding is performed by collectively supplying signals to at least two or more adjacent external circuit connecting terminals through, for example, a conductive rubber while supplying the test signals to the test terminals.

The plurality of test terminals may be used for a 'test before bonding', which will be described later, performed on the element substrate before the element substrate and the counter substrate are bonded to each other, as well as the test after bonding.

According to the above-mentioned electro-optical device, it is unnecessary to provide the test terminal for supplying the test image signals, which makes it possible to considerably reduce the number of test terminals, as compared with a structure in which only the test terminals are used for the test after bonding. Therefore, in the above-mentioned electro-optical device, it is possible to reduce a region for arranging the test terminals in the protruding region of the element substrate and thus to reduce a space. As a result, is possible to reduce the area of the protruding region of the element substrate and thus to reduce the size of the electro-optical device. Thus, it is possible to relatively easily perform a test on the element substrate and the counter substrate bonded to each other before an external circuit is connected to the external circuit connecting terminals and to reduce the overall size of an electro-optical device.

In the electro-optical device according to this aspect, preferably, when a test is performed on the element substrate and the counter substrate bonded to each other before the external circuit is electrically connected to the plurality of external circuit connecting terminals, test image signals are collectively supplied to some of the external circuit connecting terminals to which the image signals are supplied when the electro-optical device is driven. In addition, preferably, test signals other than the test image signals, which are required for a test after the bonding, are supplied to the plurality of test terminals.

According to this structure, even when the pitch between the external circuit connecting terminals is relatively small, the test after bonding can be performed without any difficulty since the test image signals are collectively supplied. In addition, the number of test terminals is relatively small. Therefore, although the external circuit connecting terminals are arranged at a sufficiently large pitch for the probe to come into contact with the external circuit connecting terminal at the time when the test after bonding is performed, a large plane space is not needed. Thus, it is unnecessary to provide the test terminals for supplying the test image signals, which makes it possible to considerably and reliably reduce the number of test terminals, as compared with a structure in which only the test terminals are used for the test after bonding.

In the electro-optical device according to this aspect, It is preferable that the plurality of test terminals be arranged along an expansion line of the array of the plurality of external circuit connecting terminals at both sides of the array of the plurality of external circuit connecting terminals.

According to this structure, the external circuit connecting terminals and the test terminals can be arranged in a line along one side of the protruding region of the element substrate. In addition, the external circuit connecting terminals can be arranged at small pitches and the test terminals can be arranged at large pitches. Therefore, it is possible to prevent an increase in the width of the protruding region of the element substrate and thus to reduce a space.

According to a second aspect of the invention, an electro-optical device includes: a counter substrate; an element substrate comprising a protruding region protruding from one side of the counter substrate and being bonded to the counter substrate; a plurality of pixel units that are arranged in a pixel region on the element substrate; a plurality of external circuit connecting terminals which are arranged in the protruding region on the element substrate and to which various signals including image signals and control signals for allowing the plurality of pixel units to display an image are supplied from an; a plurality of first test terminals which are provided at both ends of an array of the plurality of external circuit connecting terminals in the protruding region and to which first test signals required for a test performed after the element substrate and the counter substrate are bonded to each other are supplied; and a plurality of second test terminals which are at least partially arranged in a region covered with the counter substrate after the element substrate and the counter substrate are bonded to each other, in a portion of a peripheral region of the element substrate, and to which second test signals required for a test performed before the element substrate and the counter substrate are bonded to each other are supplied.

The electro-optical device according to the second aspect is substantially similar to the electro-optical device according to the first aspect except that the second test terminals in addition to the first test terminals are provided as the plurality of test terminals and distances between the external circuit connecting terminals and distances between the first test terminals are not restricted. In addition, the electro-optical device according to the second aspect operates in the same manner as that in which the electro-optical device according to the first aspect operates, in a normal mode. For example, the electro-optical device according to the second aspect operates in the same manner as that in which the electro-optical device according to the first aspect at the time of a display test or a test after bonding. The electro-optical device according to the second aspect is formed so as to be suitable for a test before bonding.

That is, in the electro-optical device according to the second aspect, in particular, the plurality of second test terminals are at least partially arranged in a portion of the peripheral region of the element substrate other than the protruding region. The plurality of second test terminals are covered with the counter substrate in plan view after the element substrate and the counter substrate are bonded to each other, and the second test terminals is not needed for a test after bonding. The second test signals required for the test before bonding are supplied to the plurality of second test terminals. More specifically, in the portion of the peripheral region of the element substrate, the second test terminals are completely covered with the counter substrate, or they are covered with the counter substrate so that probing is difficult in plan view. Since the second test terminals can be formed by using a region that is inaccessible by the probe after the bonding, the second test terminals dose not cause an increase in the area of the protruding region or an increase in the area of the element substrate.

The second test signals are supplied to the plurality of second test terminals through, for example, probes at the time of the test before bonding using the second test terminals, a connection test for, for example, circuits and wiring lines, an insulating test, and an operational test. Then, the test is performed on the basis of the second test signals. In addition, the test before bonding may be performed by integrating a test circuit for testing the selection operation of each pixel unit into the element substrate and inputting/outputting the second test signals to/from the test circuit.

Therefore, it is possible to prevent a reduction in the space of the substrate by means of the second test terminals, and it is also possible to sufficiently increase the pitch between the second test terminals so that the prove can be accurately electrically connected to the second test terminals. In addition, similar to the first test terminals in the electro-optical device according to the first aspect, the second test terminal may be formed to have a larger size than that of the external circuit connecting terminal.

Further, at the time of the test before bonding, the test signals may be supplied through the first test terminals, or the test image signals or other test signals may be collectively supplied through the plurality of external circuit connecting terminals by means of electrical connection between the conductive rubber and the external circuit connecting terminals, similar to the test after bonding described above. That is, even in the test before bonding, the first test terminals or the external circuit connecting terminals are used together with the second test terminals, that is, the first test terminals or the external circuit connecting terminals are used in a plurality of tests, which makes it possible to reduce the number of terminals required for the test.

In the electro-optical device according to the second aspect, the test after bonding is performed by supplying the first test signals to the first test terminals and the test image signals to the external circuit connecting terminals, as in the electro-optical device according to the first aspect. In the test after bonding, the plurality of second test terminals are not used.

As described above, in the electro-optical device according to second aspect, the second test terminals not used in the test after bonding are arranged in a portion of the peripheral portion that is covered with the counter substrate after bonding, and the first test terminals used in the test after bonding are arranged in the protruding region that is not covered with the counter substrate after bonding. Therefore, the test after bonding as well as the test before bonding can be easily performed, and it is possible to reduce the size of an electro-optical device.

In the electro-optical device according to the above-mentioned aspect, preferably, a distance between adjacent first test terminals is wider than a distance between adjacent external circuit connecting terminals, and a gap between adjacent second test terminals is longer than the distance between adjacent of external circuit connecting terminals.

According to this structure, in the test before bonding, electrical connection between the probe and the second test terminals can be accurately made. In the test after bonding, electrical connection between the probe and the first test terminals can be accurately made. In addition, the first test terminals, the second test terminals, and the external circuit connecting terminals make it possible to effectively prevent a reduction in the space of a substrate.

In the electro-optical device according to the above-mentioned aspect, preferably, a plurality of the element substrates are formed on a large board, and the counter substrates are bonded to the element substrates so as to be opposite to each other. In addition, preferably, after the counter substrates are bonded to the element substrates, the large board is divided to form the individual element substrates. Further, preferably, at least some of the plurality of second test terminals overlap cutting portions of the large board, in addition to or instead of the portion of the peripheral region.

According to this structure, on the large board, at least some of the plurality of second test terminals are partially arranged in the cutting region that is formed around the outer periphery of the element substrate. That is, a portion of the peripheral region of each element substrate is at least partially adjacent to the cutting region, or it partially overlaps the cutting region at least. After the test before bonding is performed, the element substrates and the counter substrates are bonded to each other, and the large board is cut along the cutting regions by dicing or scribing. Here, the term 'dicing' is a method of cutting the cutting regions by using, for example, a saw, and the term 'scribing' is a method of cutting the cutting regions with, for example, a cutter to divide the large board into a plurality of pairs of element and counter substrates. In particular, the second test terminals arranged in the cutting region are at least partially cut. That is, the cutting regions are effectively used as regions for arranging the second test terminals. As a result, the effective use of the cutting regions of the large board enables the test before bonding and makes it possible to reduce the size of the element substrate.

According to the above-mentioned aspect, preferably, the electro-optical device further includes a sealing material that bonds the element substrate to the counter substrate in a sealing region surrounding the pixel region of the element substrate in plan view. In addition, preferably, the plurality of second test terminals are at least partially arranged in the sealing region.

According to this structure, the plurality of second test terminals are at least partially arranged in the sealing region. That is, a portion of the peripheral region partially overlaps the sealing region at least. In other words, it is possible to perform the test before bonding and reduce the size of the element substrate by effectively using the sealing region as a region for arranging the second test terminals.

In the electro-optical device according to the above-mentioned aspect, preferably, at least some of the plurality of first test terminals are used for a test before the bonding in addition to a test after the bonding. In addition, preferably, test signals other than the first test signals supplied to the first test terminals at the time of the test before bonding are supplied to the plurality of second test terminals as the second test signals.

According to this structure, at the time of the test before bonding, the second test signals are supplied to the second test terminals and the first test signals are also supplied to the first test terminals. For example, the test before bonding may be performed by integrating a test circuit for testing the selection operation of each pixel unit into the element substrate, selecting each pixel unit by the first test signals instead of the second test signals, and inputting/outputting the second test signals to/from the test circuit. In this way, it is possible to reduce the number of second test terminals, as compared with a structure in which the second test signals are supplied to only the second test terminals, at the time of the test before bonding. Thus, it is possible to further reduce the space of the element substrate.

In the electro-optical device according to the above-mentioned aspect, preferably, the plurality of second test terminals include second terminals of the same type to which signals similar to at least one of the various signals in type are supplied as the second test signals. Preferably, each of the second terminals of the same type is electrically connected, through a resistor element, to one of the plurality of external circuit connecting terminals to which at least one of the various signals is supplied. Further, preferably, the same type of signals among the second test signals are supplied from the second terminals of the same type through the resistor elements at the time of the test before the bonding.

According to this structure, at the time of the test before bonding, signals of the same type as that of at least one of various signals are supplied to the same type of second terminals included in the plurality of second test terminals. The same type of second terminals are electrically connected, through the resistor elements, to the external circuit connecting terminals to which the same type of signals are supplied. Therefore, it is possible to suitably perform, for example, a connection test, an insulating test, and an operational test for circuits and wiring lines related to the same type of signals, on the basis of the same type of signals. Further, an increase in the resistance of the resistor element makes it possible to prevent an electric circuit connected to the opposite side of the resistor element, as viewed from the same type of second terminals, from being damaged due to static electricity of the same type of second terminals having already been used, after the test before bonding, for example, after the electro-optical device is manufactured, at the time of conveyance, or during driving.

In the electro-optical device according to the above mentioned aspect, preferably, the plurality of first test terminals include first terminals of the same type to which signals similar to at least one of the various signals in type are supplied as the first test signals. Preferably, each of the first terminals of the same type is electrically connected, through a resistor element, to one of the plurality of external circuit connecting terminals to which at least one of the various signals is supplied. Further, preferably, the same type of signals among the first test signals are supplied from the first terminals of the same type through the resistor elements at the time of the test after the bonding.

According to this structure, at the time of the test after bonding, signals of the same type as that of at least one of various signals are supplied to the same type of first terminals included in the plurality of first test terminals. The same type of first terminals are electrically connected, through the resistor elements, to the external circuit connecting terminals to which the same type of signals are supplied. Therefore it is possible to suitably perform the test after bonding, on the basis of the same type of signals. Further, an increase in the resistance of the resistor element makes it possible to prevent an electric circuit connected to the opposite side of the resistor element, as viewed from the same type of first terminals, from being damaged due to static electricity of the same type of first terminals having already been used, after the test after bonding, for example, after the electro-optical device is manufactured, at the time of conveyance, or during driving.

In the electro-optical device according to the above-mentioned aspect, preferably, the plurality of test terminals include the same type of terminals to which signals similar to at least one of the various signals in type are supplied as the test signals, and the same type of terminals are electrically connected, through resistor elements to the plurality of external circuit connecting terminals to which at least one of the various signals is supplied. In addition, preferably the same type of signals among the test signals are supplied from the same type of terminals through the resistor elements in the test performed after the element substrate and the counter substrate are bonded to each other.

According to this structure, at the time of the test after bonding, signals of the same type as that of at least one of various signals are supplied to terminals of the same type included in the plurality of test terminals. The same type of terminals are electrically connected, through the resistor elements, to the external circuit connecting terminals to which the same type of signals are supplied. Therefore, it is possible to suitably perform the test after bonding, on the basis of the same type of signals. Further, an increase in the resistance of the resistor element makes it possible to prevent an electric circuit connected to the opposite side of the resistor element, as viewed from the same type of terminals, from being damaged due to static electricity of the same type of terminals having already been used, after the test after bonding, for example, after the electro-optical device is manufactured, at the time of conveyance, or during driving.

According to a third aspect of the invention, there is provided a method of testing an electro-optical device. The electro-optical device includes: a counter substrate; an element substrate that has a protruding region projecting from one side of the counter substrate and is bonded to the counter substrate; a plurality of pixel units that are arranged in a pixel region on the element substrate; a plurality of external circuit connecting terminals which are arranged in the protruding region of a peripheral region of the pixel region on the element substrate and to which various signals including image signals and control signals for allowing the plurality of pixel units to display an image are supplied from an external circuit; and a plurality of test terminals that are provided at both ends of an array of the plurality of external circuit connecting terminals in the protruding region. The method includes: when a test is performed on the element substrate and the counter substrate bonded to each other before the external circuit is electrically connected to the plurality of external circuit connecting terminals, collectively supplying test image signals to some of the external circuit connecting terminals to which the image signals are supplied; supplying, to the plurality of test terminals, test signals other than the test image signals, which are required for a test after the bonding; and checking, as the test after the bonding, whether image display is performed in the plurality of pixel units, in response to the test image signal, after the test image signals and the test signals are supplied.

According to the method of testing an electro-optical device according to the above-mentioned aspect, similar to the electro-optical device according to the first aspect, first, the test image signals are collectively supplied to the external circuit connecting terminals, and the test signals are supplied to the test terminals. In this state, it is tested whether image display is performed in the plurality of pixel units, in response to the test image signals. Therefore, even when the distance between the plurality of external circuit connecting terminals is narrower than the distance between the plurality of test terminals, it is possible to perform the test after bonding without any difficulty. As a result, similar to the electro-optical device according to the first aspect, it is possible to reduce the area of the protruding region on the element substrate and thus to reduce a space. In addition, it is possible to relatively easily perform the test after bonding.

In the method of testing an electro-optical device according to the above-mentioned aspect, preferably, in the collectively supplying of the test image signals, a conductive rubber is electrically connected to the plurality of external circuit connecting terminals, and the test image signals are collectively supplied to the plurality of external circuit connecting terminals through the conductive rubber. Further, preferably, in the supplying of the test signals, the test signals are supplied to the plurality of test terminals through probes.

According to the above-mentioned aspect, at the time of the test after bonding, preferably, a conductive rubber having anisotropy is electrically connected to the plurality of external circuit connecting terminals arranged at small pitches, and thus the test image signals are collectively supplied. In addition, preferably, the test signals are supplied to the plurality of test terminals arranged at large pitches through, for example, probes. Therefore, it is possible to further reduce a space and to easily perform the test after bonding. In particular, a relatively inexpensive conductive rubber is used for electrical connection to the external circuit connecting terminals, which makes it possible to prevent the element substrate from being damaged and to achieve good electrical connection therebetween. Further, since an inexpensive conductive rubber is used, it is possible to easily replace the conductive rubber with a new one and to perform the test after bonding at low cost.

According to a fourth aspect of the invention, an electronic apparatus includes the electro-optical device according to the first aspect or the second aspect.

Since the electro-optical device according to the first aspect or the second aspect is applied to the electronic apparatus, it can contribute to reducing the size of an electronic apparatus. The electro-optical device according to the above-mentioned aspects can be applied to various electronic apparatuses, such as a projection-type display apparatus, a television, a cellular phone, an electronic organizer, a word processor, a viewfinder-type or monitor-direct-view-type videotape recorder, a workstation, a video phone, a POS terminal, and apparatuses having touch panels.

The above-mentioned effects and other advantages of the invention can be apparent from the following description of exemplary embodiments.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Preferred embodiments of the invention will be described with reference to the accompanying drawings. In the following embodiment, an electro-optical device of the invention is applied to a liquid crystal display device.

Overall Structure of Liquid Crystal Display Device

First, the overall structure of a liquid crystal display device according to an embodiment of the invention will be described with reference to FIGS. 1 to 3.

Figure 1:
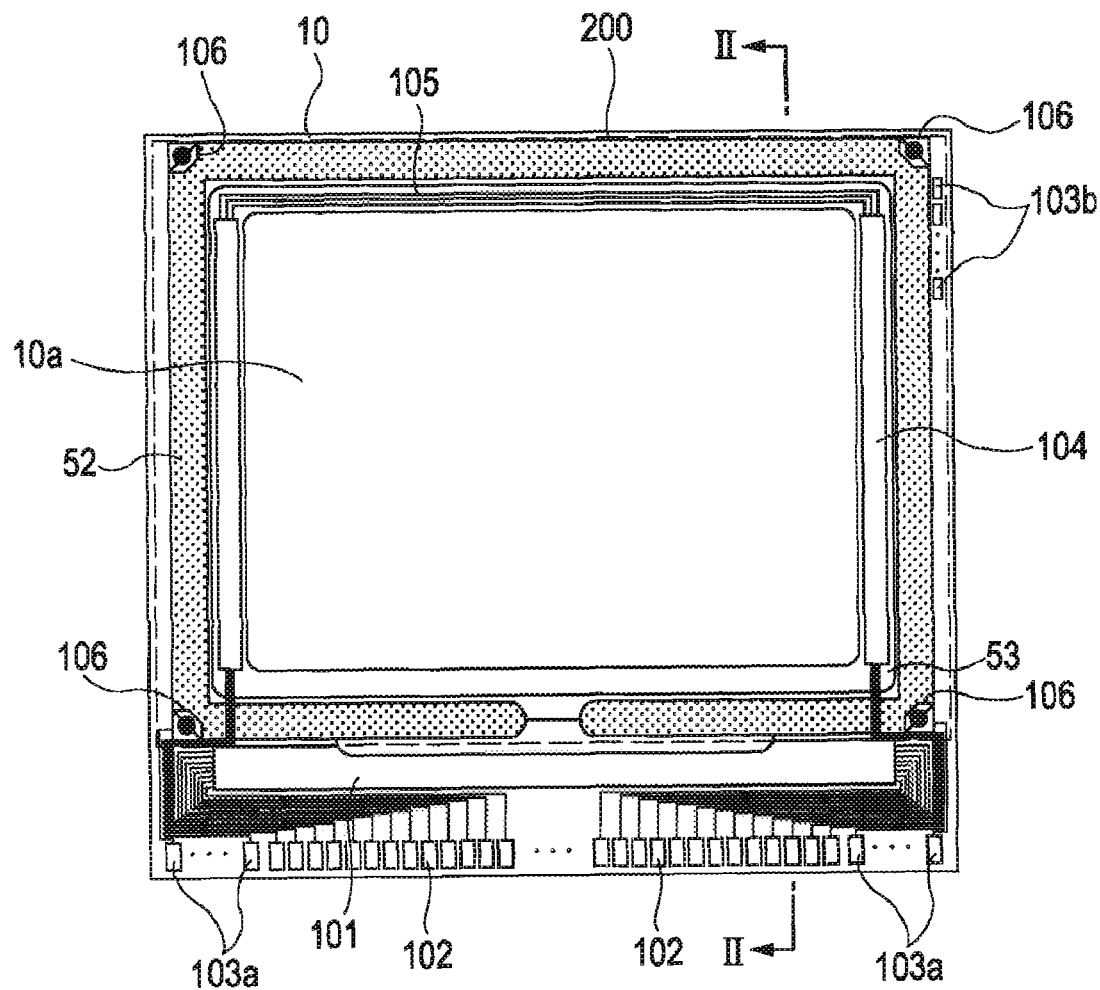
FIG. 1 is a plan view illustrating the overall structure of a liquid crystal display device according to an embodiment of the invention.
Figure 2:
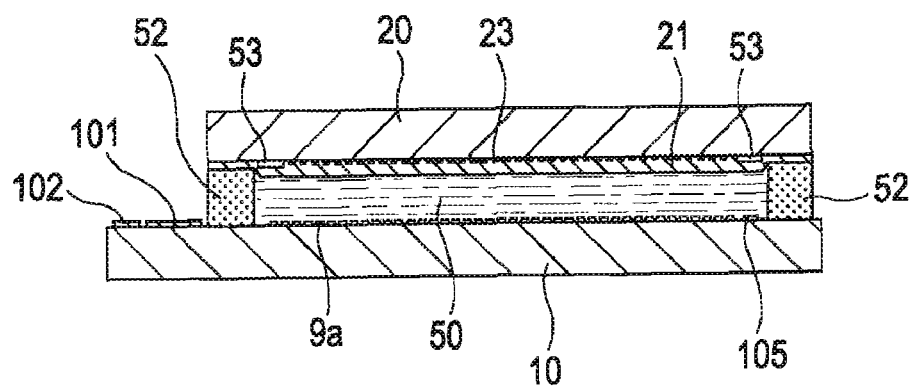
FIG. 2 is a cross-sectional view taken along the line II-II of FIG. 1.

FIG. 1 is a plan view of the liquid crystal display device, as viewed from a counter substrate, and FIG. 2 is a cross-sectional view taken along the line II-II of FIG. 1. In FIGS. 1 and 2, the liquid crystal display device includes a TFT array substrate 10, which is an example of an 'element substrate' according to the invention, and a counter substrate 20 opposite to the TFT array substrate 10. In FIG. 1, the arrangement of the counter substrate 20 with respect to the TFT array substrate 10 is represented by a region that is surrounded by a dotted line 200. The TFT array substrate 10 is formed to have a larger area than the counter substrate so that at least one side of the TFT array substrate 10 protrudes or is exposed from a corresponding side of the counter substrate 20 in plan view (that is, in FIG. 1) when the TFT array substrate 10 overlaps the counter substrate 20.

A liquid crystal layer 50 is interposed between the TFT array substrate 10 and the counter substrate 20, and the TFT array substrate 10 and the counter substrate 20 are bonded to each other by a sealing material 52 provided in a sealing region located around the periphery of an image display region 10a. The liquid crystal layer 50 is injected into the image display region 10a surrounded by the sealing material 52 between the TFT array substrate and the counter substrate 20.

The sealing material 52 is formed of, for example, an ultraviolet-curable resin or a thermally curable resin to bond the substrates. In a manufacturing process, the sealing material 52 is applied onto the TFT array substrate 10 and is then hardened by irradiation with ultraviolet rays or by heating. In addition, gap members, such as glass fibers or glass beads, are dispersed in the sealing material 52 to maintain a gap (inter-substrate gap) between the TFT array substrate 10 and the counter substrate 20 at a predetermined value.

A frame-shaped light-shielding film 53 for defining a frame region of the image display region 10a is provided around the inner periphery of the sealing region having the sealing material 52 arranged therein on the counter substrate 20. Alternatively, a portion of or the entire frame-shaped light-shielding film 53 may be provided on the TFT array substrate 10 as an integrated light-shielding film.

A data line driving circuit 101 and a plurality of external circuit connecting terminals 102 are provided along one side of a portion of the TFT array substrate 10 protruding from the counter substrate 20, in a peripheral region of the image display region 10a on the TFT array substrate 10. A plurality of first test terminals 103a are provided along the one side at both sides of an array of the external circuit connecting terminals 102. That is, the plurality of first test terminals 103a are arranged in a region that laterally extends along a lower side of the array substrate 10 in FIG. 1. As shown in FIG. 1, the plurality of first test terminals 103a are arranged at both sides of the array of the external circuit connecting terminals 102. Alternatively, the first test terminals 103a may be arranged on one end (that is, only the right end or the left end of FIG. 1) of the array of the external circuit connecting terminals 102 along one side of the TFT array substrate 10. An external circuit mounted in, for example, a COF (Chip On Film) manner is electrically connected to the plurality of external circuit connecting terminals 102.

Scanning line driving circuits 104 are provided along two sides of the TFT array substrate 10 adjacent to the one side along which the external circuit connection terminals 102 are arranged such that they are covered with the frame-shaped light-shielding film 53. In addition, a plurality of wiring lines 105 for connecting the two scanning line driving circuits 104 arranged at both sides of the image display region 10a are provided along the remaining side of the TFT array substrate 10 so as to be covered with the frame-shaped light-shielding film 53.

A plurality of second test terminals 103b are arranged along one of or all the two sides of the TFT array substrate 10 where the scanning line driving circuits 104 are arranged. That is, the plurality of second test terminals 103b are arranged in a strip-shaped region longitudinally extending along the right edge of the TFT array substrate 10 in FIG. 1, which is an example of 'a portion of peripheral region' according to the invention. In FIG. 1, the second test terminals 103b are provided along one of the two sides of the TFT array substrate 10. At least some of the plurality of second test terminals 103b are arranged in a strip-shaped region that is covered with or hidden by the counter substrate 20 in plan view (that is, in FIG. 1) in the peripheral region of the TFT array substrate 10. In this way, in the strip-shaped region of the TFT array substrate 10, the plurality of second test terminals 103b are partially covered with the counter substrate 20 in plan view so that probing is difficult at the time of scanning, which will be described below.

Further, vertical connection terminals 106 are provided on the TFT array substrate 10 to ensure electrical connection to the counter substrate 20.

In FIG. 2, on the TFT array substrate 10, pixel electrodes 9a are formed on pixel switching TFTs and various wiring lines, and an alignment film is formed thereon. On the other hand, a counter electrode 21 is formed in the image display region 13a on the counter substrate 20 so as to be opposite to the plurality of pixel electrodes 9a with the liquid crystal layer 50 interposed therebetween. A display element composed of the pixel electrode 9a, the counter electrode 21, and the liquid crystal layer interposed therebetween is formed in each of the pixels arranged in the image display region 10a on the FT array substrate 10. That is, a pixel portion is formed in each pixel. When a voltage is applied between the pixel electrodes 9a and the counter electrode 21, the display elements perform image display. A lattice-shaped or strip-shaped light-shielding film 23 is formed on the counter electrode 21, and an alignment film is formed thereon. The liquid crystal layer 50 is composed of one kind of nematic liquid crystal or liquid crystal obtained by mixing several kinds of nematic liquid crystal, and the liquid crystal is arranged in a predetermined alignment state between the two alignment films.

Although not shown in FIG. 1 or 2, other circuits, such as a sampling circuit and a test circuit, are formed on the TFT array substrate 10, as well as the data line driving circuit 101 and the scanning line driving circuits 104. The sampling circuit samples image signals transmitted through image signal lines, which will be described later, and supplies the sampled image signals to data lines. The test circuit evaluates the quality and tests defects of the liquid crystal display device during manufacture or prior to shipping. In this embodiment, in addition to the above-mentioned circuits, for example, a precharge circuit for supplying precharge signals having a predetermined voltage level to a plurality of data lines prior to the image signals may be formed.

Further, for example, polarizing films, retardation films, and polarizing plates, are respectively formed in predetermined directions on a surface of the counter substrate 20 on which projection light is incident and a surface of the TFT array substrate 10 from which light is emitted, according to the operating mode, such as a TN (twisted nematic) mode, an STN (super TN) mode, and a D-STN (double STN) mode, or the display mode, such as a normally white mode and a normally black mode.

Next, the electrical configuration of the liquid crystal display device will be described with reference to FIG. 3. FIG. 3 is a block diagram illustrating the electrical configuration of the liquid crystal display device. In the liquid crystal display device shown in FIG. 3, the TFT array substrate 10 and the counter substrate 20 (not shown in FIG. 3) are opposite to each other with the liquid crystal layer interposed therebetween. A voltage applied to the pixel electrodes 9a of the display elements that are arranged in a matrix in the image display region 10a is controlled to modulate an electric field applied to the liquid crystal layer in each pixel. In this way, the quantity of light passing between the two substrates is controlled, and the gray-scale display of an image is performed. In this embodiment, the liquid crystal display device uses a TFT active matrix driving method.

A plurality of scanning lines 2 and a plurality of data lines 3 are formed in the image display region 10a of the TFT array substrate 10 such that they intersect each other. The display elements of the pixels are arranged so as to correspond to intersections of the scanning lines 2 and the data lines 3. In this way, the pixel electrodes 9a of the display elements are arranged in a matrix at predetermined intervals in the image display region 10a of the TFT array substrate 10.

Figure 3:
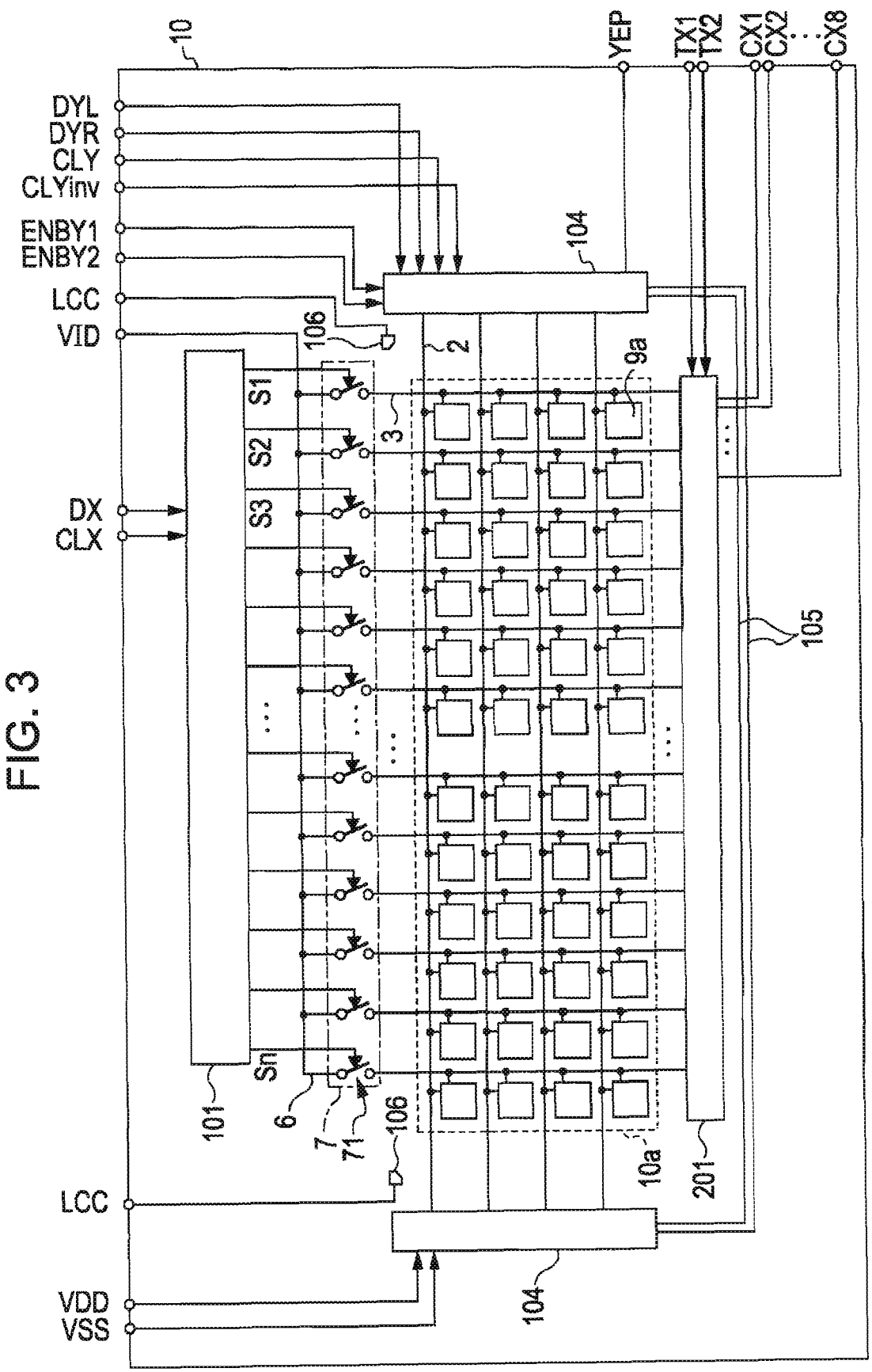
FIG. 3 is a block diagram illustrating the electrical structure of the liquid crystal display device.

Although not shown in FIG. 3, TFTs, serving as pixel switching elements, which are turned on or off in response to scanning signals supplied through the scanning lines 2, and storage capacitors for holding a voltage to be applied to the pixel electrodes 9a are formed on electrical paths of the pixel electrodes 9a and the data lines 3. The pixel switching elements may be formed of transistors other than the TFTs or TFDs.

In addition to the data line driving circuit 101 shown in FIG. 1, a test circuit 201 is formed in the peripheral region of the image display region 10a along one side of the TFT array substrate 10 where the wiring lines 105 for electrically connecting the two scanning line driving circuits 104 are provided.

In this embodiment, when the liquid crystal display device is driven, the external circuit connecting terminals shown in FIG. 1 or 2 are supplied from an external circuit with a counter electrode potential LCC, an image signal VID, and timing signals, such as a clock signal CLX or CLY for driving the data line driving circuit 101 and the scanning line driving circuits 104, as examples of 'various signals' according to the invention.

In this embodiment, the data line driving circuit 101 sequentially generates and outputs sampling signals Si (i=1, ... n) from each stage on the basis of an X clock signal CLX having a predetermined cycle (and an inverted signal CLXinv of the X clock signal) and an X start pulse DX that are supplied through the external circuit connecting terminals 102.

A sampling circuit 7 includes a plurality of sampling switches 71 provided in the data lines 3. Each of the sampling switches 71 is formed of, for example, a single channel TFT, such as a P-channel TFT or an N-channel TFT, or a complementary TFT. In addition, each sampling switch 71 samples an image signal VID supplied to an image signal line 6 shown in FIG. 3 through the external circuit connecting terminals 102 on the basis of the sampling signal Si output from the data line driving circuit 101, and outputs the sampled signal to the data line 3. In this way, the plurality of pixel electrodes 9a arranged in a matrix are selected in the arrangement direction of the data lines 3 by the image signal VID supplied to every column of pixel electrodes and are then driven.

An external circuit performs serial-to-parallel expansion (that is phase expansion) on the image signal VID to expand the phase of the image signal to six phases, twelve phases, and so on, and the polarities of the voltages of the phase-expanded image signals VID are inverted into a positive polarity or a negative polarity with respect to a reference potential. Then, the phase-expanded image signals VID are supplied to the external circuit connecting terminals 102. The phase-expanded image signals VID are input to the sampling circuit 7 through the plurality of image signal lines 6 formed corresponding to the number of image signals VID. When parallel image signals obtained by converting serial image signals are simultaneously supplied to the plurality of image signal lines 6, it is possible to supply the image signals to each group of data lines 3 and thus to reduce a driving frequency. For the convenience of explanation, only one image signal line 6 is shown in FIG. 3, and the detailed structure related to the supply of the phase-expanded image signal VID is not shown.

The scanning line driving circuit 104 is driven as follows in order to scan each row of pixel electrodes 9a arranged in a matrix with the image signals and the scanning signals in a direction vertical to the arrangement direction of the scanning lines 2. That is, the scanning line driving circuits 104 are supplied with a Y clock signal CLY, which is a reference clock for the supply of the scanning signal, an inverted signal CLYinv of the Y clock signal CLY, two types of Y start pulses DYL and DYR, and two types of enable signals ENBY1 and ENBY2 through the external circuit connecting terminals 102. Each of the scanning line driving circuits 104 generates scanning signals on the basis of the Y clock signal, the inverted signal CLYinv of the Y clock signal CLY, and two types of Y start pulses DYL and DYR, and sequentially supplies the scanning signals to the plurality of scanning lines 2 at the timing based on each of two types of enable signals ENBY1 and ENBY2. At that time, in FIG. 3, a voltage is applied to both ends of each scanning line 2 at the same time.

In this embodiment, the scanning line driving circuit 104 vertically scans each row of pixel electrodes 9a both in the upward and downward directions in FIG. 3, on the basis of two types of Y start pulses DYL and DYR. The scanning line driving circuits 104 are driven by two types of power voltages VDD and VSS supplied through the external circuit connecting terminals 102 from an external circuit.

The counter electrode potential LCC is supplied from the external circuit connecting terminals 102 to signal lines extending from the vertical connection terminals 106. The counter electrode potential LCC is supplied to the counter electrode 21 through the vertical connection terminals 106. The counter electrode potential LCC is a reference potential of the counter electrode 21 for suitably maintaining a potential difference between the pixel electrode 9a and the counter electrode 21 to form a liquid crystal capacitor.

Structure of First and Second Test Terminals

Figure 4A:
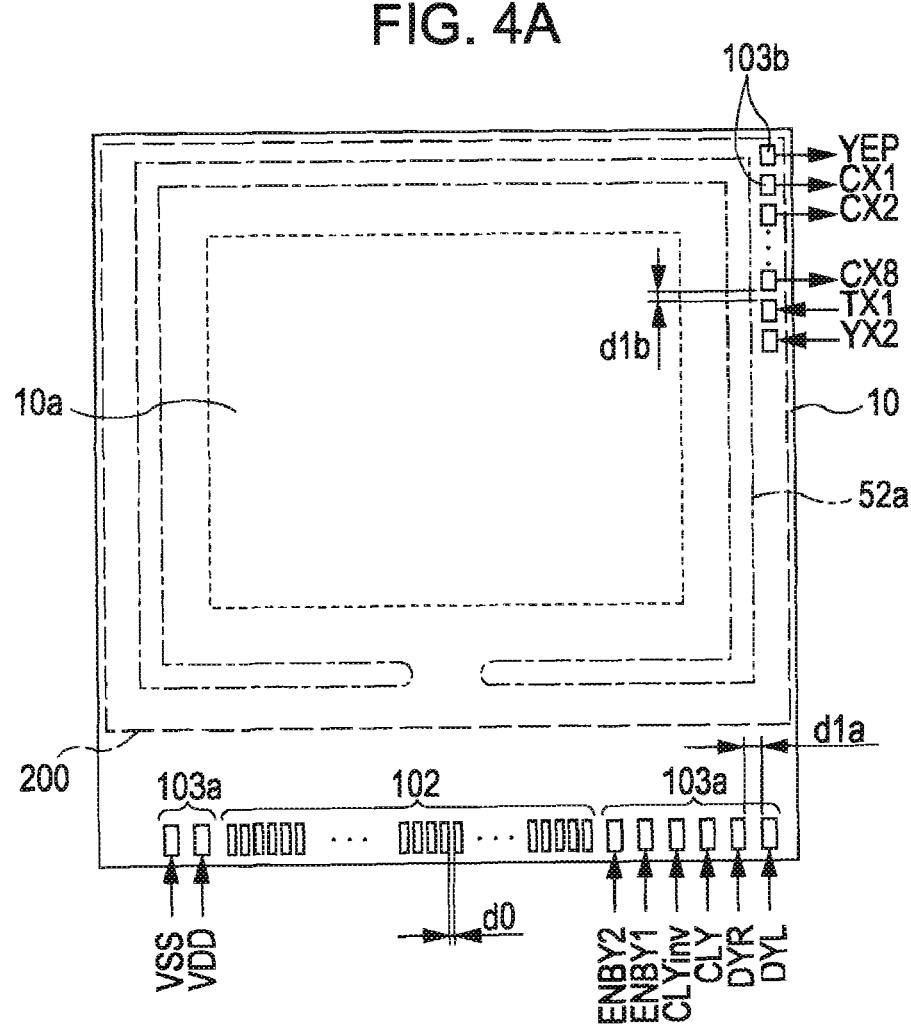
FIG. 4A is a plan view illustrating the structure of a first test terminal and a second test terminal.
Figure 4B:
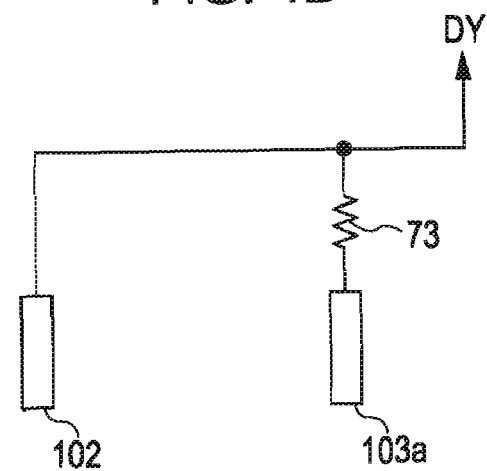
FIG. 4B is a diagram illustrating the electrical structure of the first test terminal and an external circuit connecting terminal.

Next, the structure of the first test terminal 103a and the second test terminal 103b will be described in detail below with reference to FIGS. 4A to 6, in addition to FIGS. 1 to 3. FIG. 4A is a plan view illustrating the structure of the first test terminal 103a and the second test terminal 103b, and FIG. 4B is a diagram illustrating the electrical structure of the first test terminal 103a and the external circuit connecting terminal 102.

Figure 5:
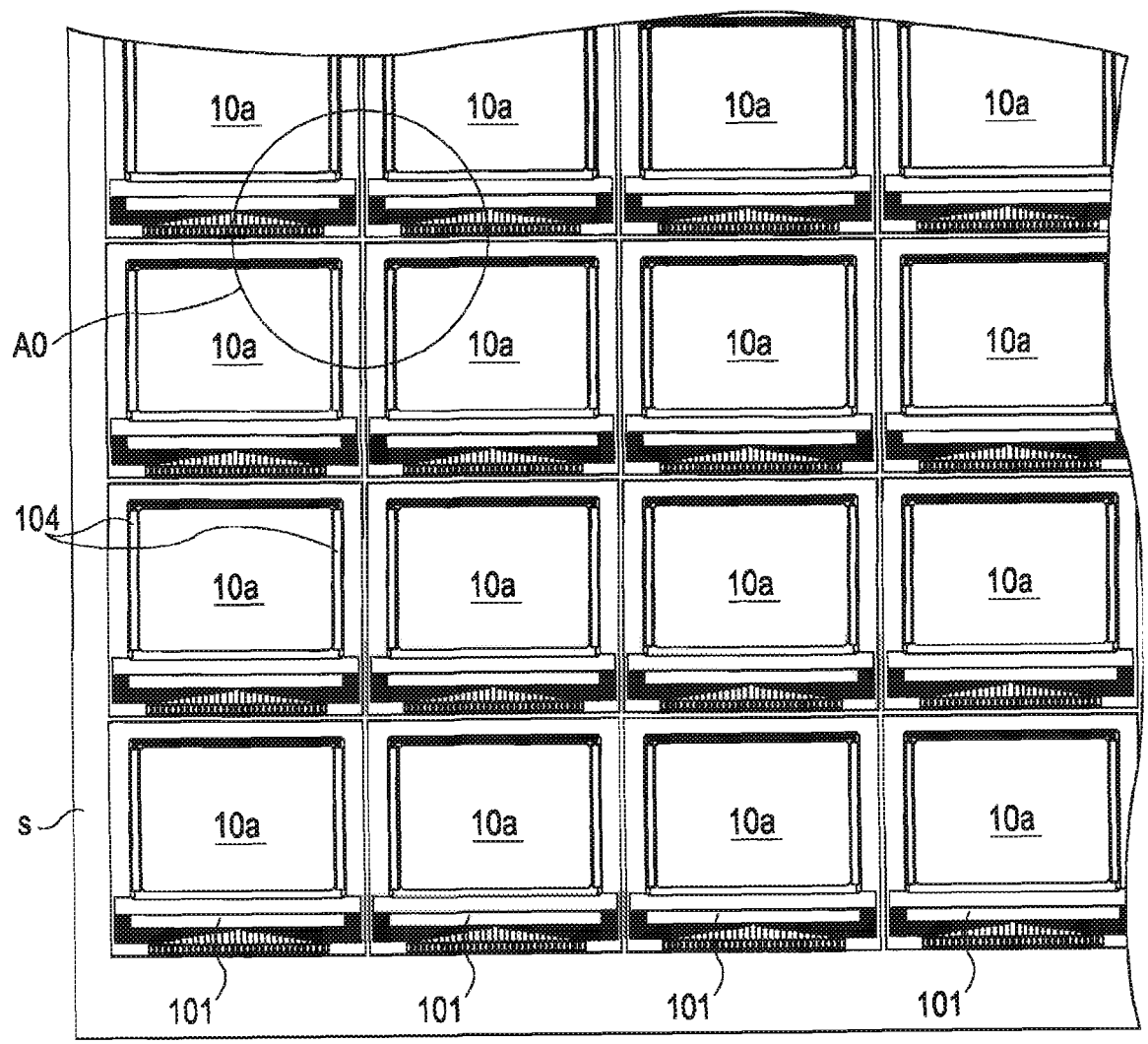
FIG. 5 is a partial plan view illustrating the liquid crystal display device according to the embodiment manufactured on a mother board.
Figure 6:
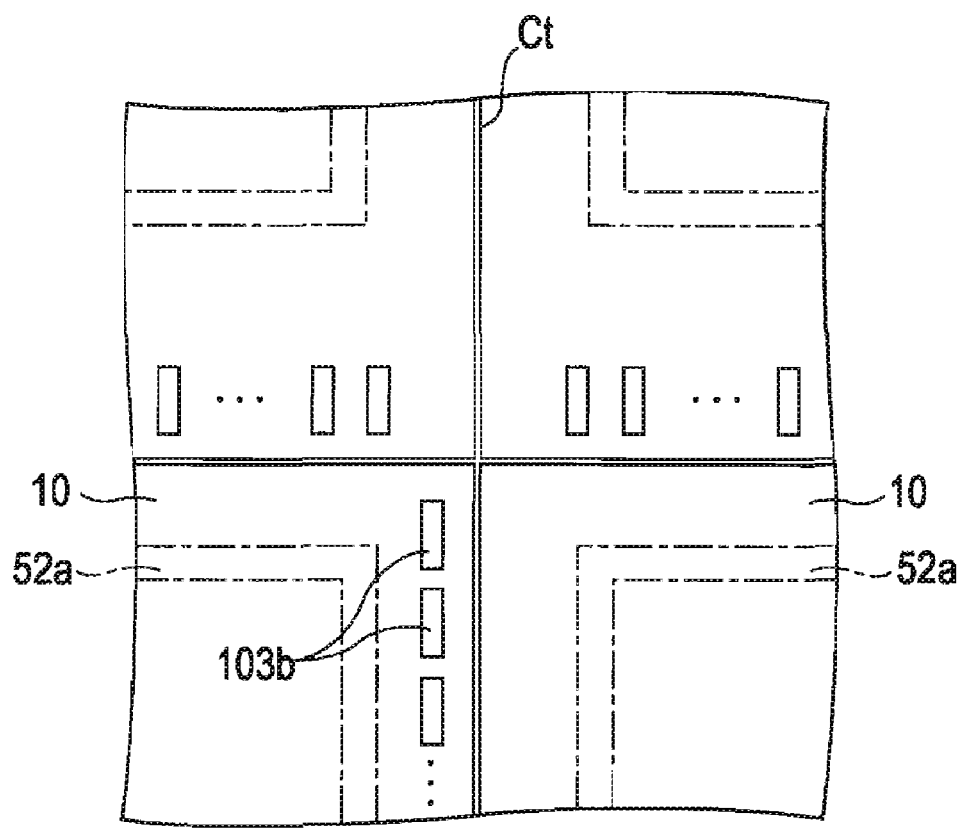
FIG. 6 is a partial enlarged plan view illustrating the structure of a circular portion represented by a dotted line A0 in FIG. 5.

FIG. 5 is a partial plan view illustrating the liquid crystal display devices of this embodiment manufactured on a mother board. FIG. 6 is a partial enlarged plan view illustrating the structure of a circular portion represented by a dotted line A0 in FIG. 5.

In this embodiment, in a process of manufacturing the liquid crystal display device, before an external circuit is connected to or mounted on the plurality of external circuit connecting terminals 102 after the TFT array substrate 10 and the counter substrate 20 are bonded to each other, a display test, which is an example of a 'test after bonding' according to the invention, is performed on each display element. In this embodiment before the TFT array substrate 10 and the counter substrate 20 are bonded to each other, various tests, such as an electrical test for the driving of each display element, are performed, in addition to the display test. For example the following tests may be performed: a test for checking whether the scanning lines 2 or the data lines 3 are broken or short-circuited; and a test for checking the operation of the data line driving circuit 101 and the scanning line driving circuits 104.

In this embodiment, the plurality of first test terminals 103a are used at the time of the display test and a test before bonding, and the plurality of second test terminals 103b are used at the time of the test before bonding.

FIG. 4A shows the structure of the plurality of first test terminals 103a and the plurality of second test terminals 103b and the arrangement relationship among the first and second test terminals 103a and 103b, the counter substrate 20, and the sealing region 52a having the sealing material 52 formed therein. Similar to FIG. 1, the counter substrate 20 is represented by a region surrounded by a dotted line 200 in FIG. 4A.

In FIG. 4A, various signals for selecting each row or column of display elements at the time of the display test and the test before bonding are supplied, as first test signals, to the first test terminals 103a that are arranged along one side of the TFT array substrate 10 protruding from the counter substrate 20. In this embodiment, a Y clock signal CLY and an inverted signal CLYinv of the Y clock signal CLY for driving the scanning line driving circuits 104, two types of Y start pulses DYL and DYR, two types of enable signals ENBY1 and ENBY2, and two types of power voltages VDD and VSS, which are the same kind of signals as those supplied to the external circuit connecting terminals 102, are supplied to the plurality of first test terminals 103a as first test signals FIG. 4B shows the electrical structure of the external circuit connecting terminal 102 and one of the plurality of first test terminals 103a to which the Y start pulse DYL or LYR (DY) is input.

As showing in FIG. 4B, the first test terminal 103a and the external circuit connecting terminal 102 both supplied with the same type of Y start pulse DY are electrically connected to each other through a resistor element 73. The Y start pulse DY supplied to the first test terminal 103a is supplied to the scanning line driving circuit 104 through the resistor element 73. The resistor element 73 is formed of a conductive material, such as conductive polysilicon, and has a resistance value of about 2 kΩ to 3 kΩ.

In this embodiment, the other of the plurality of first test terminals 103a to which the Y clock signal CLY and the inverted signal CLYinv of the Y clock signal CLY, the two types of enable signals ENBY1 and ENBY2, and the two types of power voltages VDD and VSS are supplied are formed in the same structure as the first test terminal 103a to which the Y start pulse DY is input. In this way, it is possible to drive the scanning line driving circuits 104 by various signals supplied to the first test terminals 103a at the time of the display test and the test before bonding, in the same way as that in which the scanning line driving circuits are generally driven after a liquid crystal display device is completely manufactured.

In this embodiment, it is unnecessary to form an electrical circuit having additional wiring lines for testing the driving of each display element, except for wiring lines related to the driving of the liquid crystal display device, which makes it possible to reduce the size of the TFT array substrate 10. In the external circuit connecting terminal 102 and the first test terminal 103a to which the same type of signal is supplied, the resistor element 73 is electrically connected to the first test terminal 103a, which causes the first test terminal 103a to have high resistance. Therefore, it is possible to prevent the scanning line driving circuit 104 from being damaged due to static electricity of the first test terminals 103a not used, after the liquid crystal display device is manufactured, at the time of conveyance, or during driving.

The plurality of external circuit connecting terminals 102 are arranged such that a gap d0 between adjacent external circuit connecting terminals 102 is sufficiently small so that adjacent external circuit connecting terminals 102 are not electrically connected to each other by probes at the time of the display test or the test before bonding. For example, the plurality of external circuit connecting terminals 102 are arranged such that the gap d0 between adjacent external circuit connecting terminals 102 is about 50 μm. In this way, even when the total number of external circuit connecting terminals 102 is large due to a large number of serial-to-parallel expansions, the arrangement length of the external circuit connecting terminals 102 is made smaller than a predetermined value.

The first test terminals 103a are arranged such that a distance d1a between the first test terminals 103a adjacent to each other is larger than the distance d0 between adjacent external circuit connecting terminals 102 of the plurality of external circuit connecting terminals 102. More specifically, the distance d1a between the first test terminals 103a adjacent to each other is sufficiently large so that the first adjacent test terminals 103a can be electrically connected to each other by probes with high accuracy. For example, the plurality of first test terminals 103a are arranged such that the distance d1a between the first test terminals 103a adjacent to each other is about 100 μm. In addition, each of the first test terminals 103a is formed to have a larger size than the external circuit connecting terminal 102 so that it can be accurately electrically connected to a probe.

In FIG. 4A, when the scanning line driving circuit 104 is driven at that time of the test before bonding, an end pulse YEP output from the last stage of the scanning line driving circuit 104, test driving signals TX1 and TX2 for driving the test circuit 201 shown in FIG. 3, and output signals CX (CX1, CX2, ..., CX8) output from the test circuit 201 are input, as second test signals, to the plurality of second test terminals 103b arranged in the strip-shaped region that is covered with the counter substrate 20 in plan view in the peripheral region of the TFT array substrate 10.

Similar to the first test terminals 103a, the plurality of second test terminals 103b are arranged such that a distance d1b between the second test terminals 103b adjacent to each other is larger than the distance d0 between adjacent external circuit connecting terminals 102 of the plurality of external circuit connecting terminals 102. More specifically, the distance d1b between the second test terminals 103b adjacent to each other is sufficiently large so that the second adjacent test terminals 103b can be electrically connected to each other by probes with high accuracy. For example, the plurality of second test terminals 103b are arranged such that the distance d1b between the second test terminals 103b adjacent to each other is about 100 μm. In addition, similar to the first test terminals 103a, each of the second test terminals 103b is formed to have a larger size than the external circuit connecting terminal 102.

The liquid crystal display devices according to this embodiment are collectively formed on a mother board S shown in FIG. 5. That is, the liquid crystal display devices are arranged in a matrix on the mother board S, and various components described with reference to FIGS. 1 to 4B (for example, the TFTs, the scanning lines 2, the data lines 3, the scanning line driving circuits 104, and the data line driving circuit 101) are formed in each of the liquid crystal display devices.

The mother board S shown in FIG. 5 includes a plurality of TFT array substrates 10 shown in FIGS. 1 and 2. That is, various components of the TFT array substrates 10 are formed on the mother board S shown in FIG. 5, and a plurality of counter substrates 20 each having, for example, the counter electrode 21 and the alignment film are formed on a glass substrate not shown in FIG. 5. The counter substrates 20 are individually divided. Then, the individual counter substrates 20 are arranged opposite to the TFT array substrates 10 formed on the mother board S, and the counter substrates 20 are bonded to the TFT array substrates 10 by the sealing material 52. Subsequently, liquid crystal is injected between each pair of the TFT array substrate 10 and the counter substrate 20. Then, the mother board S is divided, and the individual liquid crystal display device shown in FIGS. 1 and 2 is manufactured.

As shown in FIG. 6, a cutting region Ct is provided around the outer periphery of each of the TFT array substrates 10 in the mother board S. Dicing or scribing is performed on the cutting regions Ct of the mother board S to divide the mother board S.

As shown in FIGS. 4A and 4B or FIG. 6, in the strip-shaped region of the TFT array substrate 10, the plurality of second test terminals 103b are arranged outside the sealing region 52a of the TFT array substrate 10 where the sealing material 52 is formed in plan view. Alternatively, the plurality of second test terminals 103b may be arranged such that at least parts of the second test terminals 103b protrude from the sealing region 52a of the TFT array substrate 10 in plan view.

In this way, the sealing materials 52 formed on adjacent TFT array substrates 10 of the mother board S can be arranged at intervals.

Figure 7:
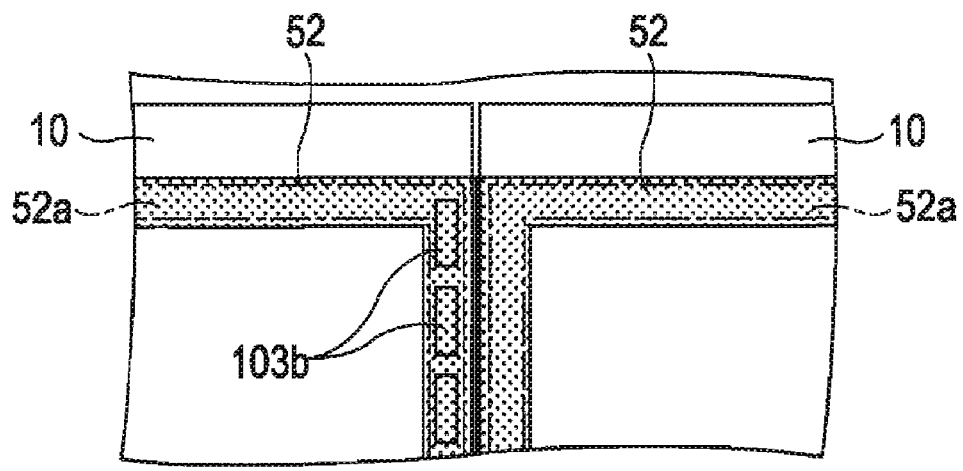
FIG. 7 is an enlarged plan view illustrating the structure of a portion corresponding to the circular portion represented by the dotted line A0 in FIG. 5 according to a comparative example of the embodiment.

FIG. 7 shows a comparative example of this embodiment. More specifically, FIG. 7 is an enlarged plan view of a portion corresponding to the circular portion represented by the dotted line A0 in FIG. 5. In FIG. 7, in the strip-shaped region of the TFT array substrate 10, the plurality of second test terminals 103b are arranged at a position overlapping the sealing region 52a having the sealing material 52 formed therein in plan view.

When the counter substrates 20 are bonded to the TFT array substrates 10 on the mother board S, a predetermined pressure is applied to surfaces of the TFT array substrate 10 and the counter substrate 20 opposite to each other to keep a predetermined gap therebetween. In this case, in the structure shown in FIG. 7, there is a fear that the sealing materials 52 may flow out from the sealing regions 52a of adjacent TFT array substrates 10 to come into contact with each other and be hardened in the contact state. In the comparative example shown in FIG. 7, it is preferable that adjacent sealing materials 52 be separated from each other so as not to come into contact with each other even when they flow out from the sealing regions 52.

In this embodiment, the sealing materials 52 can be formed at a predetermined interval on adjacent TFT array substrates 10 of the mother board S, which makes it possible to prevent the sealing materials 52 of the TFT array substrates 10 from coming into contact with each other and being hardened.

In addition to or instead of signals for driving the scanning line driving circuits 104, signals for driving the data line driving circuit 101 may be supplied to the plurality of first test terminals 103a as the first test signals.

In addition to or instead of the above-mentioned various signals, the signals for driving the scanning line driving circuits 104 and the signals for driving the data line driving circuit 101 may be supplied to the plurality of second test terminals 103b as the second test signals. The test before bonding may be performed by using the second test terminals 103b, not the first test terminals 103a.

Test of Liquid Crystal Display Device

Figure 8:
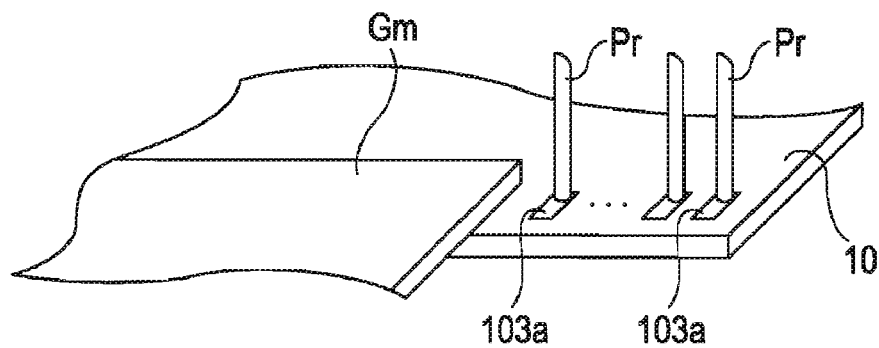
FIG. 8 is a diagram illustrating the supply of various signals, such as a first test signal, n a display test.
Figure 9:
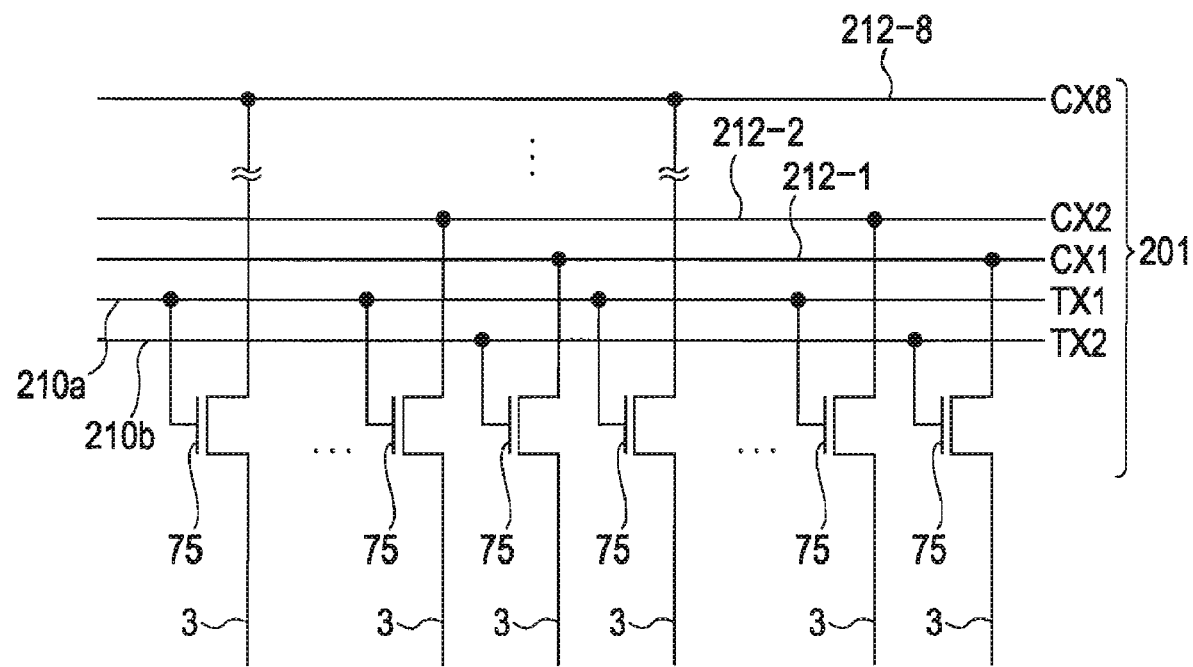
FIG. 9 is a circuit diagram illustrating an example of the structure of a test circuit.

Next, the display test and the test before bonding for the liquid crystal display device will be described below with reference to FIGS. 1 to 4B and FIGS. 8 and 9. FIG. 8 is a diagram illustrating the supply of various signals, such as the first test signals, in the display test. FIG. 9 is a circuit diagram illustrating an example of the structure of the test circuit 201.

The display test performed in the liquid crystal display device will be described first. In this embodiment, at the time of the display test, in the image display region 10a of the liquid crystal display device, a predetermined image display method, such as a method of performing display on a screen with uniform brightness or a stripe display method, is performed to check a point defect or a line defect. In this case, the display test may be performed by driving each display element to check the point defect or the line defect rather than by displaying a specific display image.

In this embodiment, the display test is performed by using the plurality of external circuit connecting terminals 102 and the plurality of first test terminals 103a. As shown in FIG. 8, at the time of the display test, for example, a conductive rubber Gm having anisotropy is electrically connected to the plurality of external circuit connecting terminals 102, so that electrical connection therebetween is collectively performed. An electrical connection test is performed on the plurality of first test terminals 103a by using, for example, probes Pr. Electrical connection to the external circuit connecting terminals is performed by using a relatively inexpensive conductive rubber, which prevents the TFT array substrate 10 from being damaged and makes it possible to achieve good electrical connection. In addition, since the conductive rubber is inexpensive, it is possible to easily replace the conductive rubber with a new one and thus to reduce test costs.

At that time, Image signals for test are collectively supplied to the plurality of external circuit connecting terminals 102 through the conductive rubber Gm. The electrical connection between the conductive rubber Gm and the external circuit connecting terminals 102 causes the data line driving circuit 101 to be driven and the counter electrode potential LCC to be supplied.

At the time of the display test, various signals for driving the scanning line driving circuits 104 are supplied; as the first test signals, to the plurality of first test terminals 103a through the probes Pr. Then, the scanning line driving circuits 104 are driven, and the scanning signals are supplied to the scanning lines 2.

At the time of the display test, each row of display elements is selected on the basis of the scanning signals, and each column of display elements performs image display on the basis of test image signals supplied through the data lines 3.

Next, the test before bonding will be described below. Before bonding, the pixel electrodes 9a of the display elements are formed in the image display region 10a of the TFT array substrate 10, but the display elements are not formed yet.

Hereinafter, as an example of the test before bonding, a test for checking the operation of the scanning line driving circuit 104 and a test for checking whether the data lines 3 are broken will be described.

First, in the test for checking the operation of the scanning line driving circuit 104, various signals for driving the scanning line driving circuit 104 are supplied, as the first test signals, to the plurality of first test terminals 103a through the probes. Then, the scanning line driving circuit 104 is driven, and the end pulse YEP is output to the second test terminals 103b as the second signal.

The test for checking whether the data lines 3 are broken is performed by the test circuit 201. An example of the structure of the test circuit 201 will be described below with reference to FIG. 9.

In FIG. 9, a plurality of switching elements 75 each composed of, for example, a single channel TFT are formed in the test circuit 201 so as to correspond to the plurality of data lines 3. Each of the switching elements 75 has a source electrically connected to the data line 3 and a gate electrically connected to a signal line 210a to which the test driving signal TX1 is supplied or a signal line 210b to which the test driving signal TX2 is supplied. A drain of the switching element 75 is electrically connected to any one of eight output signal lines 212-1, 212-2, ..., 212-8 (212).

In this embodiment, in FIG. 3, when the plurality of data lines 3 sequentially are arranged to correspond to the output order of the sampling signals Si, the test driving signal TX1 is supplied to the switching elements 75 electrically connected to even-numbered data lines 3 through the signal line 210a, and the test driving signal TX2 is supplied to the switching elements 75 electrically connected to odd-numbered data lines 3 through the signal line 210b.

The plurality of switching elements 75 are arranged such that the eight output signal lines 212-1, 212-2, ..., 212-8 are electrically connected to every eight switching elements 75.

At the time of test, when the probe is electrically connected to the second test terminal 103b, one of the test driving signals TX1 and TX2 is supplied to the signal line 210a or 210b through the second test terminal 103b. Then, the switching element 75 corresponding to the even-numbered or odd-numbered data line 3 is turned on.

Similar to the display test, the image signals for test are collectively supplied to the plurality of external circuit connecting terminals 102 through, for example, the conductive rubber Gm, and the data line driving circuit 101 is driven. In addition, similar to the display test, various signals for driving the scanning line driving circuit 104 are supplied to the plurality of first test terminals 103a as the first test signals, and the scanning line driving circuit 104 is driven.

As a result, each data line 3 is driven and has a potential corresponding to the image signal for test. A test signal having the potential of the data line 3 is input to the source of the switching element 75 in an on state, and then the output signal CX from the switching element 75 is output to the corresponding output signal line 212.

In the display test or the test before bonding, the image signals for test are supplied, through the conductive rubber Gm, to some of the plurality of external circuit connecting terminals 102 to which the image signal VID is supplied when the liquid crystal display device is driven. In addition to or instead of the signals for driving the scanning line driving circuits 104, the signals for driving the data line driving circuit 101 may be supplied to the first test terminals 103a as the first test signals to drive the data line driving circuit 101, in addition to or instead of the scanning line driving circuits 104.

In the test before bonding, the scanning line driving circuits 104 or the data line driving circuit 101 may be driven on the basis of the second test signals supplied to the second test terminals 103b.

In the above-described embodiment, it is unnecessary to provide the first test terminals 103a for supplying the image signals for test. Therefore, it is possible to reduce the number of first test terminals 103a, as compared with a structure in which only the first test terminals 103a are used in the display test.

The second test terminals 103b not used in the display test, which is a test after bonding, are arranged in the strip-shaped region of the TFT array substrate 10, and the first test terminals 103a used in the display test, which is the test after bonding, are arranged in a portion of the peripheral region of the TFT array substrate 10 protruding from the counter substrate 20 in plan view. The use of the first test terminals 103a and the second test terminals 103b in the test before bonding makes it possible to reduce the number of second test terminals 103b, as compared with a structure in which only the second test terminals 103b are used. Therefore, it is possible to reduce a region for arranging the second test terminals 103b in the peripheral region of the TFT array substrate 10.

In this embodiment, in the liquid crystal display device, the region for arranging the first test terminals 103a occupies a small area in a portion of the TFT array substrate 10 protruding from the counter substrate 20, and the first test terminals 103a and the second test terminals 103b are used as described above, which makes it possible to reduce the space of the strip-shaped region. As a result, it is possible to reduce the size of a liquid crystal display device.

Modifications

Modifications of the above-described embodiment will be described below with reference to FIGS. 1 to 9 and FIGS. 10 to 12C.

Figure 10:
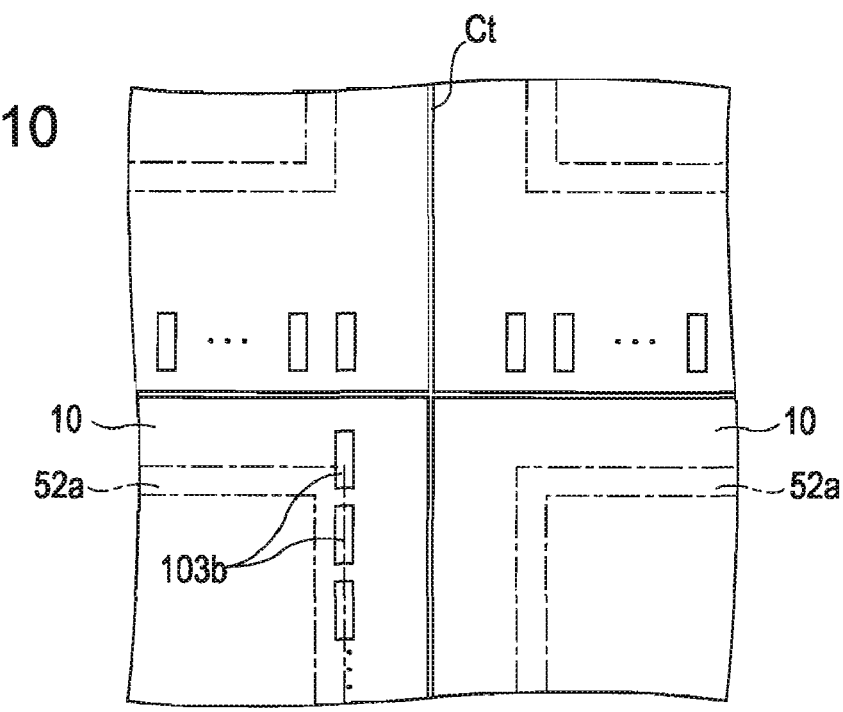
FIG. 10 is a partial enlarged plan view illustrating the structure of a portion corresponding to that shown in FIG. 6 according to a modification of the embodiment of the invention.

First, the structure of a first modification will be described with reference to FIG. 10. FIG. 10 is a partial enlarged plan view illustrating the structure of a portion of the first modification corresponding to that shown in FIG. 6.

In FIG. 6, in the strip-shaped region of the TFT array substrate 10, at least a portion of each of the plurality of second test terminals 103b is arranged at a position protruding from the sealing region 52a in the plan view. Even in this structure, similar to the structure shown in FIG. 6, the sealing materials 52 can be formed at intervals on adjacent TFT array substrates 10 on the mother board S, which makes it possible to prevent the sealing materials 52 from coming into contact with each other and being hardened between the TFT array substrates 10.

Figure 11:
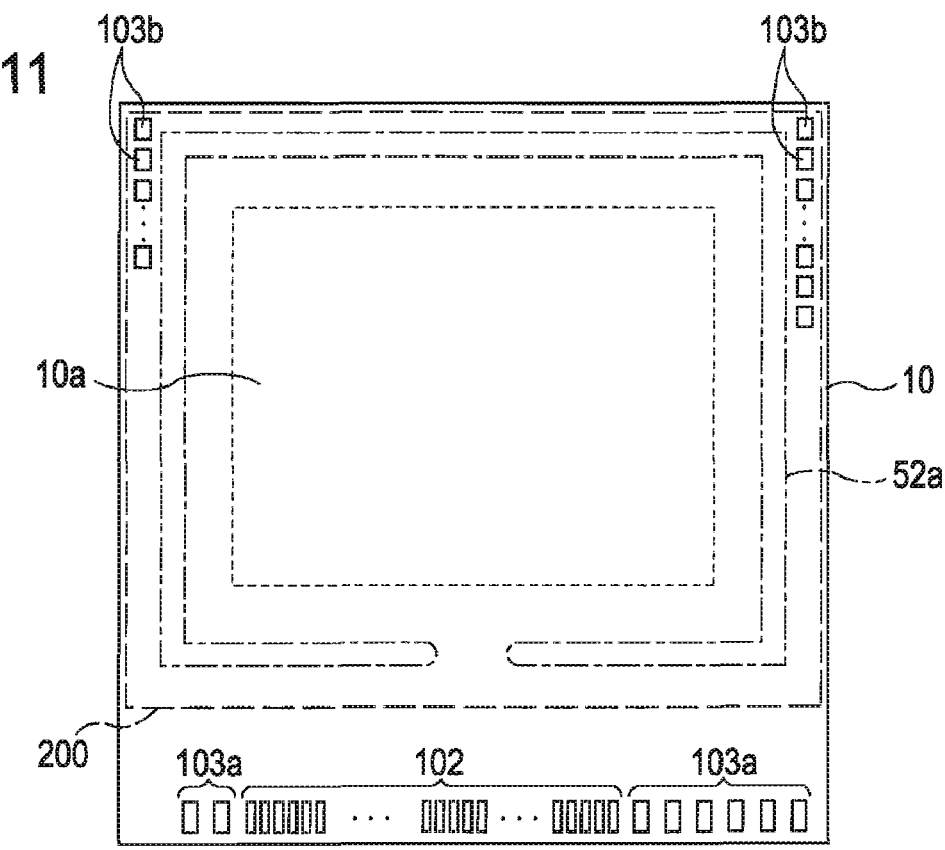
FIG. 11 is a plan view illustrating the structure of a first test terminal and a second test terminal according to another modification of the embodiment of the invention, similar to FIG. 4A.
Figure 12A:
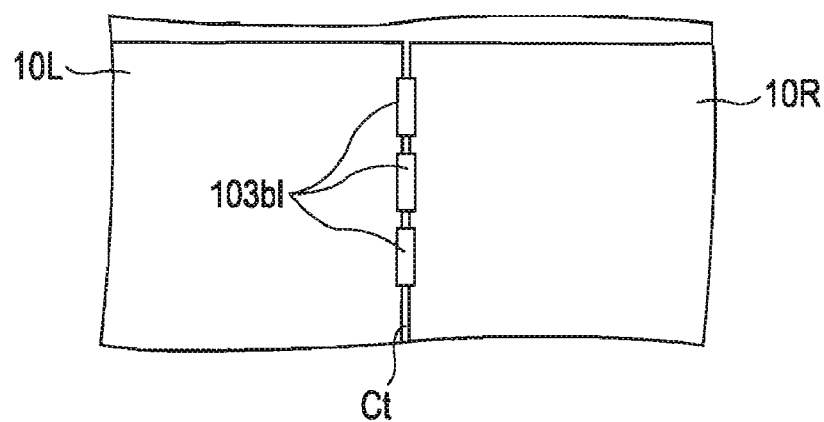
FIGS. 12A to 12C are partial enlarged plan view illustrating the arrangement structure of second test terminals according to another modifications of the embodiment of the invention.
Figure 12B:
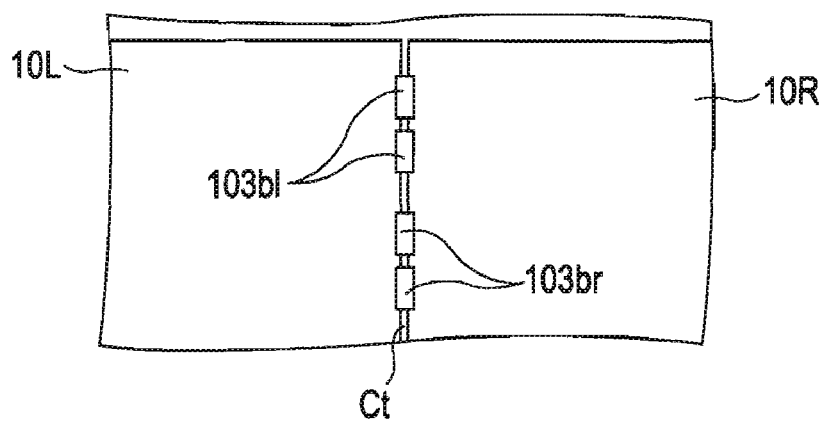
Figure 12C:
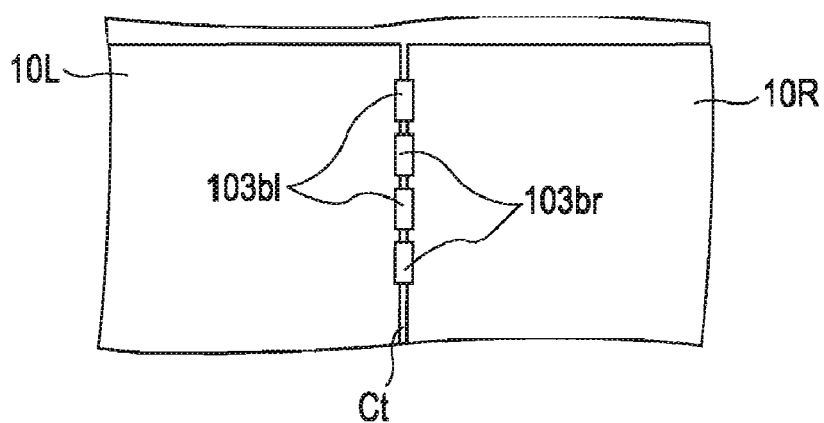

Next, a second modification of the invention will be described with reference to FIG. 11 and FIGS. 12A to 12C. FIG. 11 is a plan view illustrating the structure of the first test terminals and the second test terminals, similar to FIG. 4A. FIGS. 12A to 12C show another structure of the second modification. More specifically, FIGS. 12A to 12C are partial enlarged plan views illustrating the arrangement structure of second test terminals in a portion corresponding to that shown in FIG. 6. FIGS. 12A to 12C show the arrangement structure of the second test terminals on adjacent TFT array substrates 10 formed on the mother board S.

First, as shown in FIG. 11, in the strip-shaped region of the TFT array substrate 10, the plurality of second test terminals 103b may be arranged along two sides of the TFT array substrate 10 adjacent to one side thereof along which the external circuit connecting terminals 102 are arranged.

As described above with reference to FIG. 1 or 4A, when the plurality of second test terminals 103b are arranged along one of the two sides of the TFT array substrate 10 adjacent to the one side thereof along which the external circuit connecting terminals 102 are arranged, at least some of a plurality of second test terminals 103bl formed on one (TFT array substrate 10L) of adjacent TFT array substrates 10L and 10R on the mother board S, which is arranged on the left side of FIG. 12A, are partially arranged in a cutting region Ct of the mother board S. Although not shown in FIG. 12A, the second test terminals 103b formed on the TFT array substrate 10R, which is arranged on the right side of FIG. 12A, may be arranged in the same manner as that in which the second test terminals 103bl of the left TFT array substrate 10L are arranged.

Alternatively, as shown in FIG. 11, when the plurality of second test terminals 103b are arranged along two sides of the TFT array substrate 10 that are positioned with the image display region 10a interposed therebetween, at least some of the second test terminals 103bl formed along one side of the left TFT array substrate 10L of adjacent TFT array substrates 10L and 10R on the mother board S in FIG. 12B are arranged in the cutting region Ct. In addition, at least some of second test terminals 103br formed along one side of the right TFT array substrate 10R are arranged in the cutting region Ct together with the second test terminals 103bl.

When the plurality of second test terminals 103b are arranged along two sides of the TFT array substrate 10 that are positioned with the image display region 10a interposed therebetween, at least some of the second test terminals 103bl formed along one side of the left TFT array substrate 10L of adjacent TFT array substrates 10L and 10R on the mother board S in FIG. 12C are arranged in the cutting region Ct, and at least some of the second test terminals 103br formed along one side of the right TFT array substrate 10R are arranged in the cutting region Ct. The second test terminals 103b of the left TFT array substrate 10L and the second test terminals 103br of the right TFT array substrate 10R disposed in the cutting region Ct are alternately arranged.

As described above, according to the structures shown in FIGS. 12A to 12C, when the mother board S is divided, at least some of the second test terminals 103bl and 103br disposed in the cutting region Ct are cut. In the liquid crystal display device, at least some of the plurality of second test terminals 103b are formed along one side of the TFT array substrate 10 having the second test terminals 103b arranged therein by cutting. Therefore, According to this structure, it is possible to reduce the size of the TFT array substrate 10 by effectively using the cutting region Ct in the mother board S.

Electronic Apparatus

Next, various electronic apparatuses to which the above-mentioned liquid crystal display device is applied will be described below.

Projector

Figure 13:
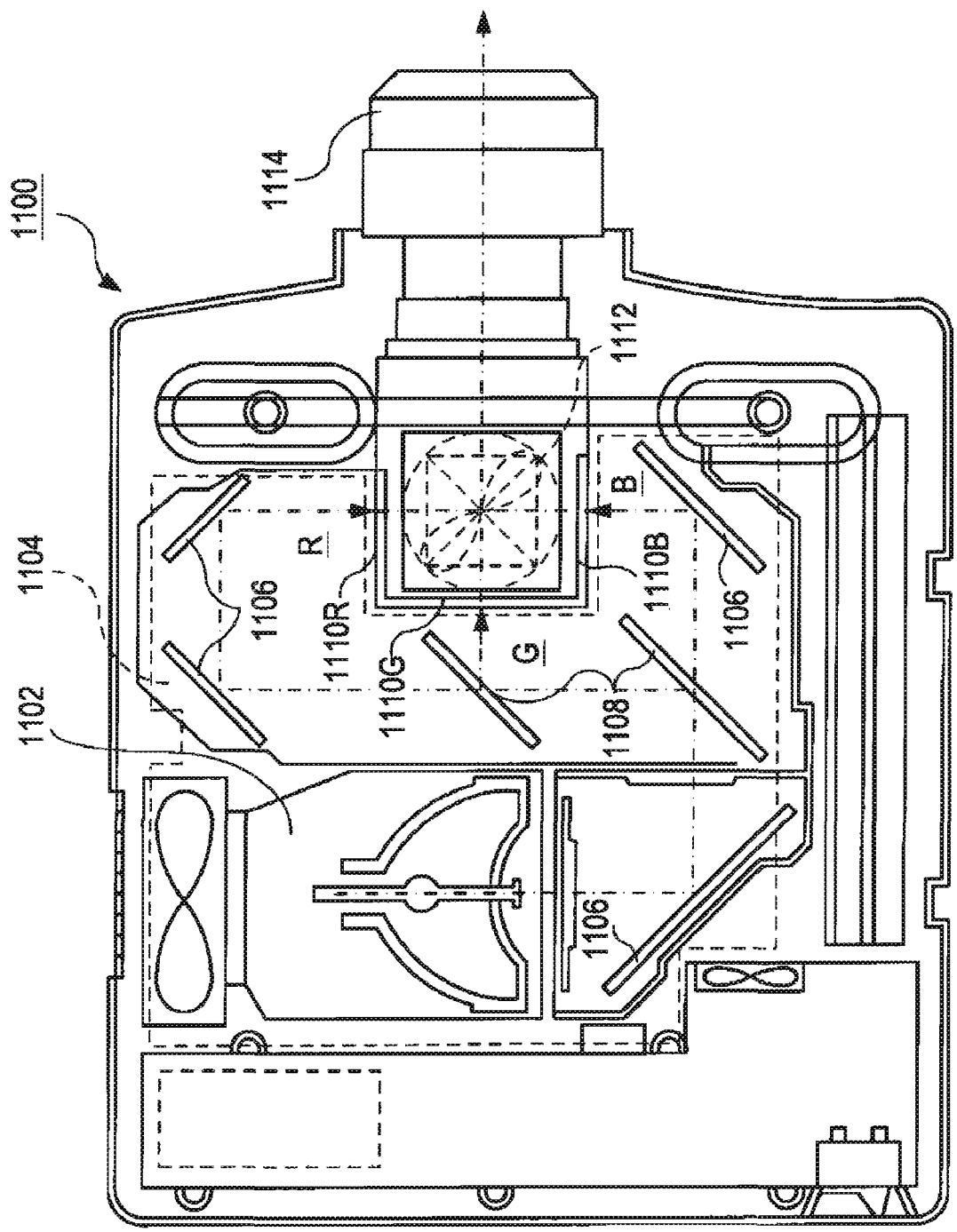
FIG. 13 is a plan view illustrating the structure of a projector, which is an example of an electronic apparatus to which the liquid crystal display device is applied.

First, a projector using the liquid crystal display device as a light valve will be described. FIG. 13 is a plan view illustrating an example of the structure of the projector. As shown in FIG. 13, a lamp unit 1102 composed of a white light source, such as a halogen lamp, is provided in a projector 1100. Projection light emitted from the lamp unit 1102 is divided into the three primary colors of R, G, and B by four mirrors 1106 and two dichroic mirrors 1108 provided in a light guide 1104, and the divided light components are incident on corresponding liquid crystal panels 110R, 1110B, and 1110G serving as light valves.

The structure of the liquid crystal panels 1110R, 1110B, and 1110G is the same as that of the above-mentioned liquid crystal device, and the liquid crystal panels 1110R, 1110B, and 1110G are driven by R, G, and B color signals supplied from an external circuit (not shown) to the external circuit connecting terminals 102. Also, light components modulated by these liquid crystal panels are incident on a dichroic prism 1112 in three directions. In the dichroic prism 1112, R and B light components are refracted at an angle of 90°, and a G light component travels straight. Accordingly, three color images are synthesized, and the synthesized color image passes through a projection lens 1114 so that a color image is projected onto a screen.

In the images displayed by the liquid crystal panels 1110R, 1110B, and 1110G, the display image of the liquid crystal panel 1110G must be horizontally inverted with respect to the display images of the liquid crystal panels 1110R and 1110B.

Since light components corresponding to the primary colors R, G, and B are incident on the liquid crystal panels 1110R, 1110B, and 1110G by the dichroic mirror 1108, respectively, a color filter is not needed.

Mobile Computer

Figure 14:
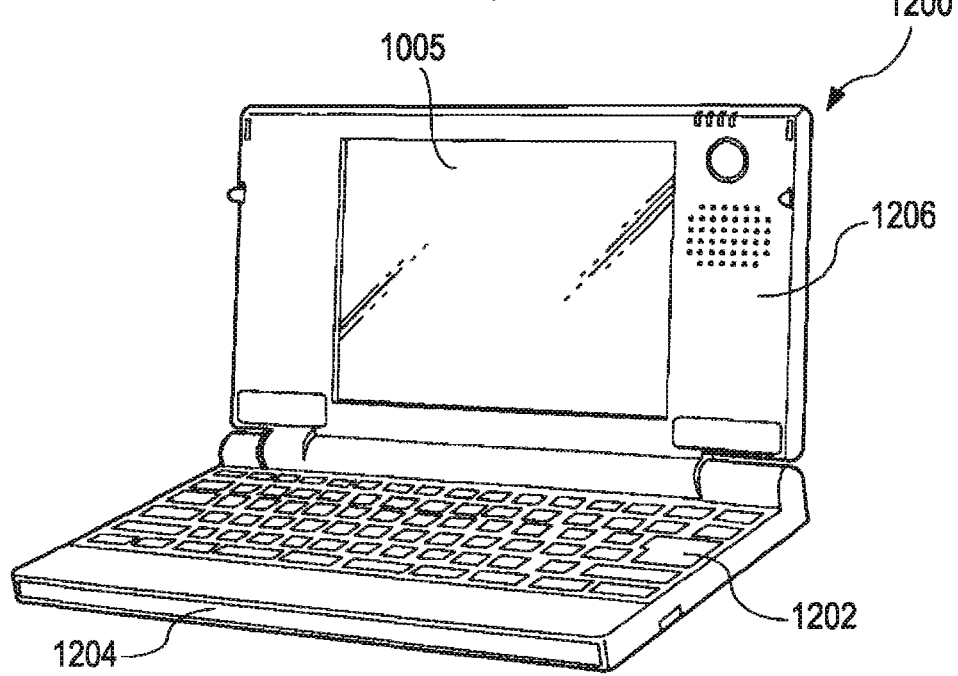
FIG. 14 is a plan view illustrating the structure of a personal computer, which is an example of the electronic apparatus to which the liquid crystal display device is applied.

Next, an example in which the liquid crystal device is applied to a mobile personal computer will be described. FIG. 14 is a perspective view illustrating the structure of the personal computer.

FIG. 14, a computer 1200 includes a main body 1204 having a keyboard 1202 and a liquid crystal display unit 1206. The liquid crystal display unit 1206 includes the above-mentioned liquid crystal display device and a backlight mounted to the rear surface of the liquid crystal display device.

Cellular Phone

Figure 15:
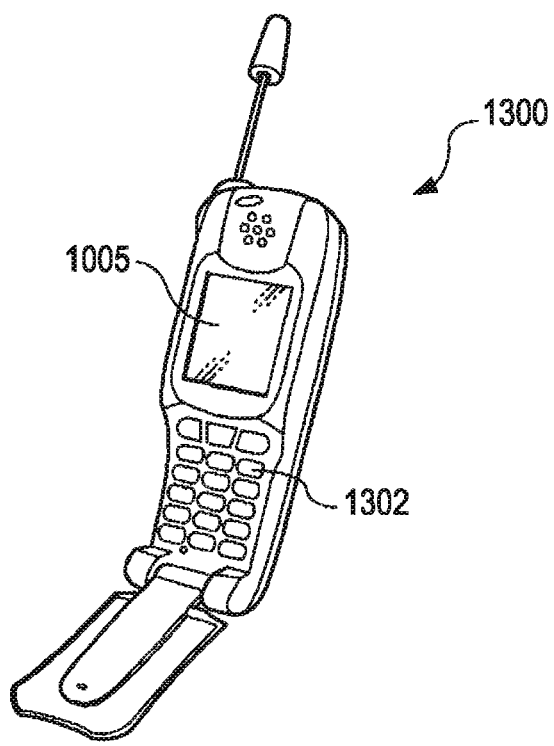
FIG. 15 is a plan view illustrating the structure of a cellular phone, which is an example of the electronic apparatus to which the liquid crystal display device is applied.

Furthermore, an example in which the liquid crystal panel is applied to a cellular phone will be described. FIG. 15 is a perspective view illustrating the structure of the cellular phone.

As shown in FIG. 15, a cellular phone 1300 includes a plurality of operation buttons 1302 and a transflective liquid crystal display device 1005. In the transflective liquid crystal device 1005, a backlight may be provided below the rear surface thereof, if necessary.

In addition to the electronic apparatuses described with reference to FIGS. 13 to 15, the liquid crystal display device of the invention can be applied to various electronic apparatuses, such as a liquid crystal television, a view-finder-type or monitor-direct-view-type videotape recorder, a car navigation apparatus, a pager, an electronic organizer, an electronic calculator, a word processor, a workstation, a video phone, a POS terminal, and apparatuses having touch panels.

The invention is not limited to the above-mentioned embodiments, but various modifications and changes of the invention can be made without departing from the spirit and scope of the invention as defined by the specification and the appended claims. It is to be understood that an electro-optical device, a test method thereof, and an electronic apparatus including the electro-optical device according to the modifications are included in the technical scope of the invention.

Further, the invention can be applied to various electro-optical devices, such as a reflective liquid crystal display device, such as LCOS, a plasma display panel, an electron emission display device, and an electrophoresis display device, in addition to the liquid crystal display device according to the above-described embodiment.

What is claimed is:

1. An electro-optical device comprising:
a counter substrate;
an element substrate comprising a protruding region protruding from one side of the counter substrate and being bonded to the counter substrate;
a plurality of pixel units that are arranged in a pixel region on the element substrate;
a plurality of external circuit connecting terminals which are arranged in the protruding region on the element substrate and to which various signals including image signals and control signals for allowing the plurality of pixel units to display an image are supplied; and
a plurality of test terminals that are provided at both ends of an array of the plurality of external circuit connecting terminals in the protruding region and are supplied with test signals,
wherein the plurality of test terminals include the same type of terminals as the plurality of external circuit connecting terminals to which signals similar in type to at least one of the various signals supplied to the plurality of external circuit connecting terminals are supplied as the test signals,
the same type of terminals are electrically connected, through resistor elements, to the plurality of external circuit connecting terminals to which at least one of the various signals is supplied, and
the same type of signals among the test signals are supplied from the same type of terminals through the resistor elements.

2. The electro-optical device according to claim 1,
wherein, when a test is performed on the element substrate and the counter substrate bonded to each other before the external circuit is electrically connected to the plurality of external circuit connecting terminals, test image signals are collectively supplied to some of the external circuit connecting terminals to which the image signals are supplied when the electro-optical device is driven, and
test signals other than the test image signals, which are required for a test after the bonding, are supplied to the plurality of test terminals.

3. The electro-optical device according to claim 1,
wherein the plurality of test terminals are arranged along an expansion line of the array of the plurality of external circuit connecting terminals at both sides of the array of the plurality of external circuit connecting terminals.

4. An electronic apparatus comprising the electro-optical device according to claim 1.

5. An electro-optical device comprising:
a counter substrate;
an element substrate comprising a protruding region protruding from one side of the counter substrate and being bonded to the counter substrate;
a plurality of pixel units that are arranged in a pixel region on the element substrate;
a plurality of external circuit connecting terminals which are arranged in the protruding region on the element substrate and to which various signals including image signals and control signals for allowing the plurality of pixel units to display an image are supplied;
a plurality of first test terminals which are provided at both ends of an array of the plurality of external circuit connecting terminals in the protruding region and to which first test signals required for a test performed after the element substrate and the counter substrate are bonded to each other are supplied; and a plurality of second test terminals which are at least partially arranged in a region covered with the counter substrate after the element substrate and the counter substrate are bonded to each other, in a portion of a peripheral region of the element substrate, and to which second test signals required for a test performed before the element substrate and the counter substrate are bonded to each other are supplied.

6. The electro-optical device according to claim 5, wherein a distance between adjacent first test terminals is longer than a distance between adjacent external circuit connecting terminals, and a distance between adjacent second test terminals is longer than the distance between adjacent external circuit connecting terminals.

7. The electro-optical device according to claim 5, wherein a plurality of element substrates are formed on a large board, the counter substrates are bonded to the element substrates so as to be opposite to each other, and, after the counter substrates are bonded to the element substrates, the large board is divided to form the individual element substrates, and at least some of the plurality of second test terminals are formed so as to overlap cutting portions of the large board, in addition to or instead of the portion of the peripheral region.

8. The electro-optical device according to claim 5, further comprising:

a sealing material that bonds the element substrate to the counter substrate in a sealing region surrounding the pixel region of the element substrate in plan view, wherein the plurality of second test terminals are at least partially arranged in the sealing region.

9. The electro-optical device according to claim 5, wherein at least some of the plurality of first test terminals are used for a test before the bonding in addition to a test after the bonding, and test signals other than the first test signals supplied to the first test terminals at the time of the test before bonding are supplied to the plurality of second test terminals as the second test signals.

10. The electro-optical device according to claim 5, wherein the plurality of second test terminals include second terminals of the same type as the plurality of external circuit connecting terminals to which signals similar in type to at least one of the various signals supplied to the plurality of external circuit connecting terminals are supplied as the second test signals, each of the second terminals of the same type is electrically connected, through a resistor element, to one of the plurality of external circuit connecting terminals to which at least one of the various signals is supplied, and the same type of signals among the second test signals are supplied from the second terminals of the same type through the resistor elements at the time of the test before the bonding.

11. The electro-optical device according to claim 5, wherein the plurality of first test terminals include first terminals of the same type as the plurality of external circuit connecting terminals to which signals similar in type to at least one of the various signals supplied to the plurality of external circuit connecting terminals are supplied as the first test signals, each of the first terminals of the same type is electrically connected, through a resistor element, to one of the plurality of external circuit connecting terminals to which at least one of the various signals is supplied, and the same type of signals among the first test signals are supplied from the first terminals of the same type through the resistor elements at the time of the test after the bonding.

12. An electro-optical device comprising:

a counter substrate;

an element substrate comprising a protruding region protruding from one side of the counter substrate and being bonded to the counter substrate;

a plurality of pixel units that are arranged in a pixel region on the element substrate;

a plurality of external circuit connecting terminals which are arranged in the protruding region on the element substrate and to which various signals including image signals and control signals for allowing the plurality of pixel units to display an image are supplied;

a plurality of first test terminals which are provided at both ends of an array of the plurality of external circuit connecting terminals in the protruding region and to which first test signals are supplied; and a plurality of second test terminals which are at least partially arranged in a region covered with the counter substrate after the element substrate and the counter substrate are bonded to each other, in a portion of a peripheral region of the element substrate, and to which second test signals are supplied.

* * * * *